US010962944B2

(12) United States Patent
Baker et al.

(10) Patent No.: US 10,962,944 B2
(45) Date of Patent: Mar. 30, 2021

(54) DISPLAY AND CONTROL OF LOAD CONTROL DEVICES IN A FLOORPLAN

(71) Applicant: Lutron Technology Company LLC, Coopersburg, PA (US)

(72) Inventors: Rhodes B. Baker, Bethlehem, PA (US); John H. Bull, Slatington, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 42 days.

(21) Appl. No.: 16/542,756

(22) Filed: Aug. 16, 2019

(65) Prior Publication Data
US 2020/0041968 A1    Feb. 6, 2020

Related U.S. Application Data

(63) Continuation of application No. 15/143,156, filed on Apr. 29, 2016, now Pat. No. 10,429,809.

(60) Provisional application No. 62/155,936, filed on May 1, 2015.

(51) Int. Cl.
*G05B 15/02*  (2006.01)
*H05B 47/11*  (2020.01)
*H05B 47/19*  (2020.01)
*H05B 47/105* (2020.01)

(52) U.S. Cl.
CPC ........... *G05B 15/02* (2013.01); *H05B 47/105* (2020.01); *H05B 47/11* (2020.01); *H05B 47/19* (2020.01); *Y02B 20/40* (2013.01)

(58) Field of Classification Search
CPC ........ G05B 15/02; H05B 47/11; H05B 47/19; H05B 47/105; H05B 47/175; Y02B 20/40
See application file for complete search history.

(56) References Cited

U.S. PATENT DOCUMENTS

| | | |
|---|---|---|
| 5,248,919 A | 9/1993 | Hanna et al. |
| 5,945,993 A | 8/1999 | Fleischmann |
| 6,118,230 A | 9/2000 | Fleischmann |
| 6,160,359 A | 12/2000 | Fleischmann |

(Continued)

OTHER PUBLICATIONS

Lutron, "Q-Admin™ Software/Quantum™ Processor Software: Light Control and Monitoring", Quantum™, QSW-L-PP-A, Sep. 16, 2008, 2 pages.

(Continued)

*Primary Examiner* — Ziaul Karim
(74) *Attorney, Agent, or Firm* — Condo Roccia Koptiw LLP

(57) ABSTRACT

A load control system may comprise an electrical load control device and/or a computing device. The electrical load control device may control, for example, motorized window treatments (e.g., shades), lighting controls, and/or sensors (e.g., occupancy, radio window, daylight, etc.). For example, a load control device comprising a motorized window treatment may control the position of a covering material in the window treatment. The computing device may comprise a processor and/or a graphical user interface (GUI). The computing device may be a server and/or a user device, such as a wireless user device (e.g., a cellular phone, tablet, or laptop computer). The computing device may be configured to provide graphical representations that may be displayed on a GUI based on load control information.

18 Claims, 21 Drawing Sheets

(56) References Cited

U.S. PATENT DOCUMENTS

| | | |
|---|---|---|
| 8,009,042 B2 | 8/2011 | Steiner et al. |
| 8,199,010 B2 | 6/2012 | Sloan et al. |
| 8,228,184 B2 | 7/2012 | Blakeley et al. |
| 8,248,014 B2 | 8/2012 | Berman et al. |
| 8,288,981 B2 | 10/2012 | Zaharchuk et al. |
| 8,410,706 B2 | 4/2013 | Steiner et al. |
| 8,417,388 B2 | 4/2013 | Altonen et al. |
| 8,451,116 B2 | 5/2013 | Steiner et al. |
| 8,471,779 B2 | 6/2013 | Mosebrook |
| 8,587,225 B2 | 11/2013 | Ashar et al. |
| 2006/0028212 A1 | 2/2006 | Steiner et al. |
| 2008/0229226 A1 | 9/2008 | Rowbottom et al. |
| 2009/0222137 A1 | 9/2009 | Berman et al. |
| 2010/0014106 A1 | 6/2010 | Hoshii |
| 2011/0029139 A1 | 2/2011 | Altonen et al. |
| 2011/0031806 A1* | 2/2011 | Altonen .............. E06B 9/68 307/32 |
| 2011/0035061 A1* | 2/2011 | Altonen .............. H05B 47/11 700/278 |
| 2012/0091804 A1* | 4/2012 | Altonen .............. H05B 47/11 307/31 |
| 2012/0095601 A1 | 4/2012 | Abraham et al. |
| 2012/0310376 A1* | 12/2012 | Krumm .............. G05B 15/02 700/31 |
| 2013/0030589 A1 | 1/2013 | Pessina et al. |
| 2013/0113284 A1* | 5/2013 | Altonen .............. H05B 47/105 307/31 |
| 2014/0132475 A1 | 5/2014 | Bhutani et al. |
| 2014/0177469 A1* | 6/2014 | Neyhart .............. H04L 12/2807 370/254 |

OTHER PUBLICATIONS

Lutron, "Quantum-Whole-Building Light Management Solution", Luton Electronics Co., Inc., Dec. 2007, 24 pages.

Lutron, "User Software for Quantum™ Total Light Management", Luton Electronics Co., Inc., Oct. 2008, 12 pages.

* cited by examiner

DISPLAY AND CONTROL OF LOAD CONTROL DEVICES IN A FLOORPLAN

CROSS-REFERENCE TO RELATED APPLICATION

This application is a continuation of Non-Provisional U.S. patent application Ser. No. 15/143,156, filed Apr. 29, 2016, which claims the benefit of U.S. Provisional Patent Application No. 62/155,936, filed May 1, 2015, the disclosures of which are incorporated herein by reference in their entireties.

BACKGROUND

A user environment, such as a residence or an office building, for example, may include various types of load control systems that may be installed therein for controlling electrical loads. A load control system may include various types of load control devices for controlling electrical loads. For example, the load control system may include lighting control devices, motorized window treatments, heating/cooling devices, or other load control devices capable of controlling an electrical load in the user environment. A user of the load control system may access the load control system via a workstation to configure, maintain, and/or access information about the load control system.

FIGS. 1A and 1B show prior art user interfaces 100, 102 that may be used to provide load control information to the user 126. FIG. 1A illustrates a user interface 100 that includes a floor plan 102. The floor plan 102 may include load control environments 104, 106, which may include motorized window treatments for raising or lowering a covering material to allow or disallow natural light from entering the load control environments 104, 106. For example, the motorized window treatments may control covering materials for covering the windows in the load control environments 104, 106. The floor plan 102 may be a floor plan for the indicated floor 108 of a building.

The user interface 100 includes a control pane 110 for controlling window treatments within the load control environments 104, 106 via motorized window treatments. The control pane 110 may be accessed via one of a number of tabs 112 for controlling different load control devices within the load control system. The shades tab may be selected to view window treatment information and/or control the windows treatments in the load control environments 104, 106. The user has to select different radio buttons 150 for displaying status information, setting shade presets, and setting shade positions for the motorized window treatment. A window treatment position may be set in the load control environments 104, 106 by configuring presets for the load control environments in the table 116 and applying the preset configuration. Individual shade groups in the load control environments 104, 106 may also be configured by selecting at least one of the load control environments 104, 106, selecting a shade group in the selected load control environments 104, 106, and adjusting the shade position to a certain level using the shade controls 114. The shade position may be applied by the user selection of the button 118. The table 116 and/or the shade controls 114 may reflect the current status of selected shades based on feedback information from the motorized window treatments.

FIG. 1B illustrates a user interface 120 that includes a floor plan 122. The load control environments 124, 126 in the floor plan 122 may include load control devices, such as electrical dimmers or light emitting diode (LED) circuits for example, for increasing or decreasing an intensity level of the lighting loads in the load control environments 124, 126. The floor plan 122 may be a floor plan for the indicated floor 128 of a building.

The user interface 120 includes a control pane 130 for controlling lighting load intensities within the load control environments 124, 126. The control pane 130 may be accessed via one of the number of tabs 112 for controlling different load control devices within the load control system. The lights tab may be selected to view lighting information and/or control the lighting loads in the load control environments 124, 126 in the load control system. The user has to select different radio buttons 152 for displaying status information, setting light presets, and setting light intensity for the lighting loads. The intensity of lighting loads may be set by configuring a for the load control environments in the table 134 and applying the preset configuration. Lighting intensity levels in individual areas in the load control system may also be configured by selecting an area in the load control system, such as load control environments 124, 126 for example, and adjusting the lighting intensity to a certain level using the lighting adjustment controls 132. The lighting intensity level may be applied by the user selection of the button 136.

As illustrated in the user interface 100 and the user interface 120, monitoring and/or controlling a load control system using current systems may be difficult and unintuitive. The current systems may not be sophisticated enough for a user's purpose. The current systems may be inefficient, as they may be unable to display information for different load control devices at the same time, or allow a user to control the devices while viewing the status of the devices in the load control environment. For example, a user may not easily determine the status of a load control environment, or the electrical loads or load control devices therein. Instead, a user may have to navigate through multiple tabs 112 to obtain and read the status of the load control environment, the status of loads, and/or the status load control devices in the load control environment. A novice user may not understand the meaning of texts in a tabs 112, such as the meaning of Select Shade Preset displayed next to a radio button 150 in the control panel 110 shown in FIG. 1A. The novice user may need to spend time familiarizing himself/herself with the system due to the inefficiency of the display and the unintuitive nature of how the information is displayed.

The current systems also do not provide load control information in detail. For example, the current systems do not allow a user to easily navigate between loads, load control devices, or portions of a load control environment. In the current systems, areas and tabs that are unnecessary to the user's purpose are continuously displayed, consuming screen space and thus unnecessarily consuming battery power. For example, a user of a load control system may wish to access only load control information for one room at the south west corner, but the current systems consistently display the other areas of the floor plan such as 124, and Center in the table 134, thus making the display of the system inefficient.

A user of a load control system may also wish to monitor a load control system by accessing historical energy usage data from different periods of time. The energy usage data at different times in the year may be compared to recognize changes in energy usage or changes that may need to be made to the load control system. Current systems for monitoring historical energy usage data also fail to provide information to users in a format that can be easily understood for the user's purposes.

FIG. 2 illustrates a prior art user interface 200 that includes occupancy status information that a user may view to determine an amount of energy used by a lighting load. The user interface 200 includes a graph 202 that indicates the occupancy status over a period of time. The occupancy status information represented in the graph 202 during the date 210 selected by the user. The user interface 200 also includes the floor 204 and a room 206 for which the occupancy status information in the graph 202 is being provided. To access other historical load control information a user may use the pane 208 to navigate to information regarding other load control devices. For example, the user may select other radio buttons 250 to display different types of historical information related to lighting, or select other tabs to display historical information for different load control devices.

The system shown in FIG. 2 may be unsophisticated and inefficient. A user is limited in the type of information the user is able to obtain regarding the historical energy usage data. For example, the user is limited to viewing load control information for a single type of load in a single location for a predetermined period of time. Tabs 112 that are unnecessary to the user's purpose are continuously displayed, consuming screen space and thus unnecessarily consuming battery power. For example, the tabs 112 labeled Shades, Controls, and Walls are continuously displayed even though the user wishes to access load control information about Lights and selects Lights.

The current systems also lack an alert mechanism to warn the user of a load control system any issues in the building and/or buildings such that the user may fix the issues before energy is wastefully consumed. Thus, it would be beneficial to provide the user with additional historical energy usage data and allow the user to control the data in a manner that is beneficial and efficient to the user.

SUMMARY

A load control system may comprise an electrical load control device and/or a computing device. The electrical load control device may control, for example, motorized window treatments (e.g., shades), lighting controls, and/or sensors (e.g., occupancy, radio window, daylight, etc.). For example, a load control device comprising a motorized window treatment may control the position of a covering material in the window treatment. The computing device may comprise a processor and/or a graphical user interface (GUI). The computing device may be a server and/or a user device, such as a wireless user device (e.g., a cellular phone, tablet, or laptop computer). The computing device may be configured to provide graphical representations that may be displayed on a GUI based on load control information.

A computing device may be configured to receive load control information from a load control device associated with an electrical load control device, such as a motorized window treatment system (e.g., shades). Load control information may also comprise information from input devices, such as sensors (e.g., occupancy, radio window, daylight, etc.) or remote control devices. Sensors may be utilized in the load control system as load control devices and/or input devices.

The computing device may be configured to determine, based on the load control information, an amount of natural light allowed in a load control environment. Load control information may also include window sensor information that indicates that amount of natural light directly received at the window, weather information, GPS information associated with the load control environment, date, time, etc. The computing device may be configured to provide a graphical representation of the amount of natural light allowed in the load control environment.

The computing device may be configured to determine, based on the load control information, the status of a lighting load in the load control environment. The computing device may be configured to display and/or provide a graphical representation indicating the status of the lighting load. The computing device may be configured to determine, based on the load control information, the occupancy status of the load control environment. The graphical representation may indicate the occupancy status.

The graphical representation may indicate the level of the load control of a plurality of levels of load control associated with the load control environment. The levels of load control may be multiple buildings, multiple floors of a building, multiple rooms of a floor, etc. Load control information may include information associated with each load control of multiple buildings, multiple floors of a building, multiple rooms of a floor, etc. The computing device may provide a graphical representation for each load control device for each level of load control. The computing device may receive indications from a user to transition to another level of load control (e.g., zoom in or out of a floorplan) and may provide different information in the graphical representation.

The computing device may be configured to determine, based on the load control environment, such as a floor of a building, a status of the natural light outside of the load control environment. The computing device may be configured to provide a graphical representation of the status of the natural light outside of the load control environment. For example, the load control device may use the determined level of natural light outside of the load control environment to determine whether a bright override mode or dark override mode may be activated. The load control device may be configured to detect the override of the automatic control of the window treatments (e.g., or any load control device) that may be caused by a digital message from a window sensor. A window sensor may indicate and/or sense the amount of natural light directly received at the window through which the natural light is allowed. The load control system may be configured to provide a graphical representation of the override caused by the digital message from the window sensor. The override of the automatic control may be based on an indication that an amount of cloud cover has caused the natural light to fall below a predefined threshold (e.g., dark override mode). The override of the automatic control may be based on an indication that an amount of direct sunlight has caused the natural light to rise above a predefined threshold (e.g., bright override mode).

A computing device may be configured to access a historical record of load control information. The load control information may include the status of the electrical load, the status of the load control device (e.g., motorized window treatments, lights, etc.), or the status of an input device (e.g., sensors) in the load control environment. For example, historical records of lighting control, occupancy information, window treatment information, and/or natural light information may be displayed on the graphical representation. The computing device may be configured, for example, to receive an indication of a time or time period associated with occupancy sensor activity in the historical record of the load control information. The computing device may display a graphical representation depicting lighting load activity based on the occupancy sensor activity in the load control environment at the time or over the time period.

DETAILED DESCRIPTION

A load control system may comprise electrical load control devices for controlling one or more electrical loads. The electrical load control devices may be, for example, motorized window treatments for controlling covering materials (e.g., shades), lighting control devices for controlling lighting loads (e.g., fluorescent lamps, light-emitting diodes (LEDs), etc.), temperature control devices for controlling a heating/cooling system, and/or other electrical load control devices. The load control system may include input devices, such as sensors (e.g., occupancy sensors, window sensors, daylight sensors, etc.). The load control devices may control the electrical loads in response to input (e.g., measurements) from the sensors.

A computing device may be implemented for displaying information to a user about the electrical load control devices and for enabling control of the electrical load control devices in the load control system. The computing device may comprise a processor and/or a display for displaying a graphical user interface (GUI). The computing device may comprise a wireless user device, such as a laptop, a tablet, a mobile phone, etc. The computing device may be configured to provide graphical representations to the wireless user device, such as may be displayed on a GUI. For example, the computing device may be a remote device, such as a remote server or system controller, that may be capable of generating and providing a graphical representation to the wireless user device via an application (e.g., web browser) executing locally on the wireless user device. The computing device may be configured to receive load control information from a load control device associated with an electrical load control device, such as a motorized window treatment (e.g., shades). Load control information may comprise information from input devices, such as sensors (e.g., occupancy, radio window, daylight, etc.). Sensors may be utilized in the load control system as load control devices and/or input devices.

Figure 1A:
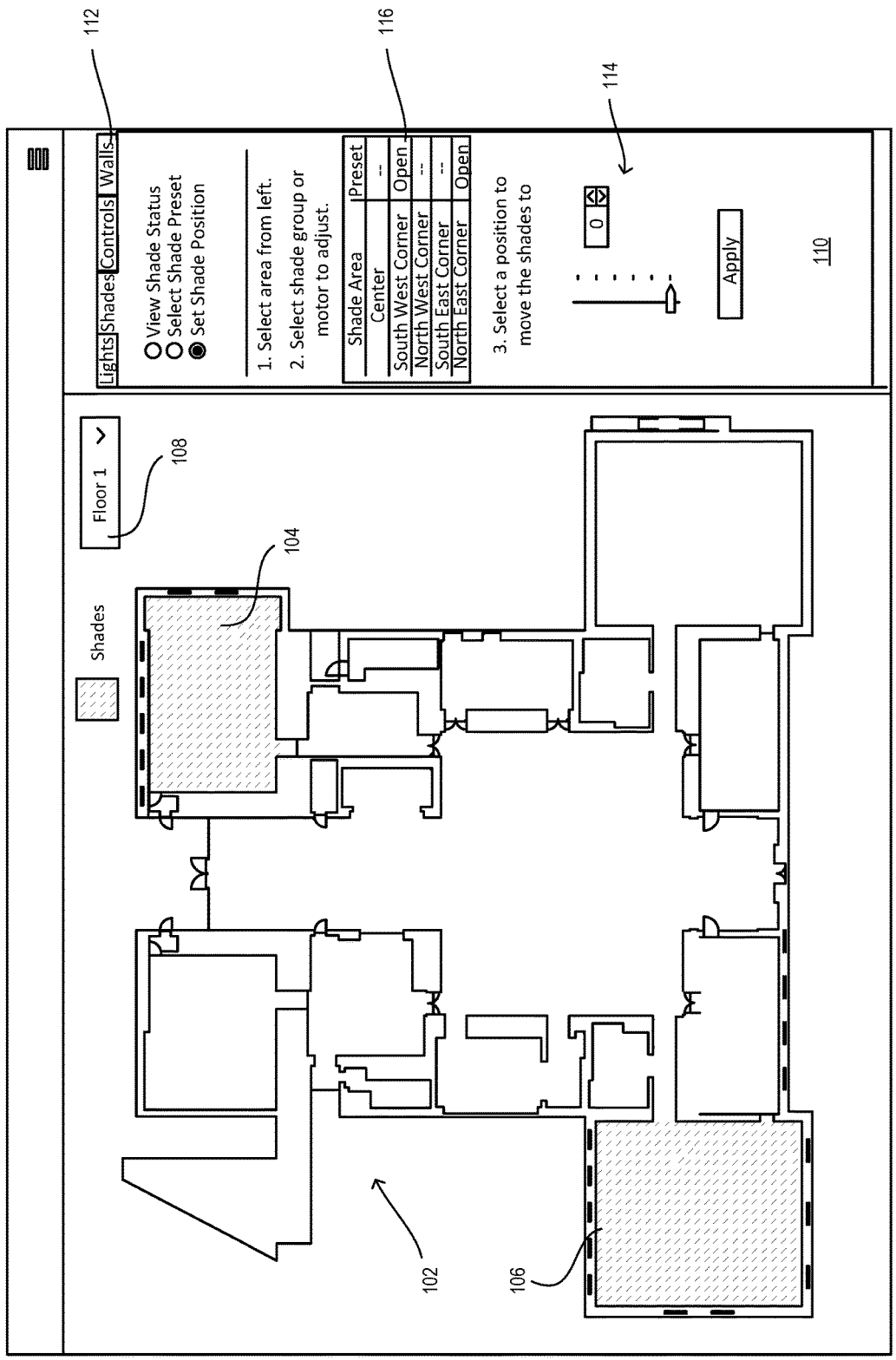
FIG. 1A depicts an example prior art user interface that includes a floor plan.
Figure 1B:
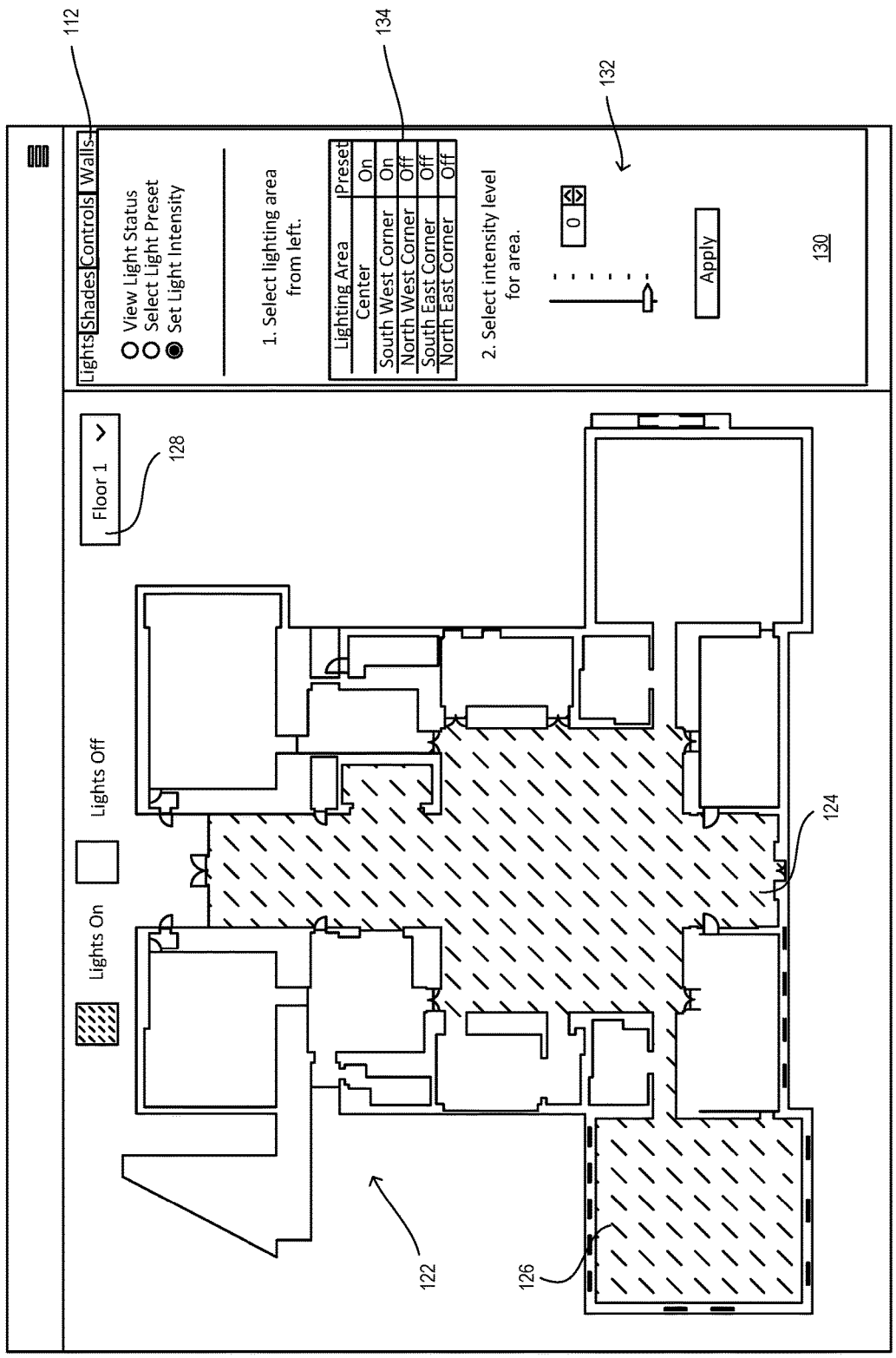
FIG. 1B depicts another example prior art user interface that includes a floor plan.
Figure 2:
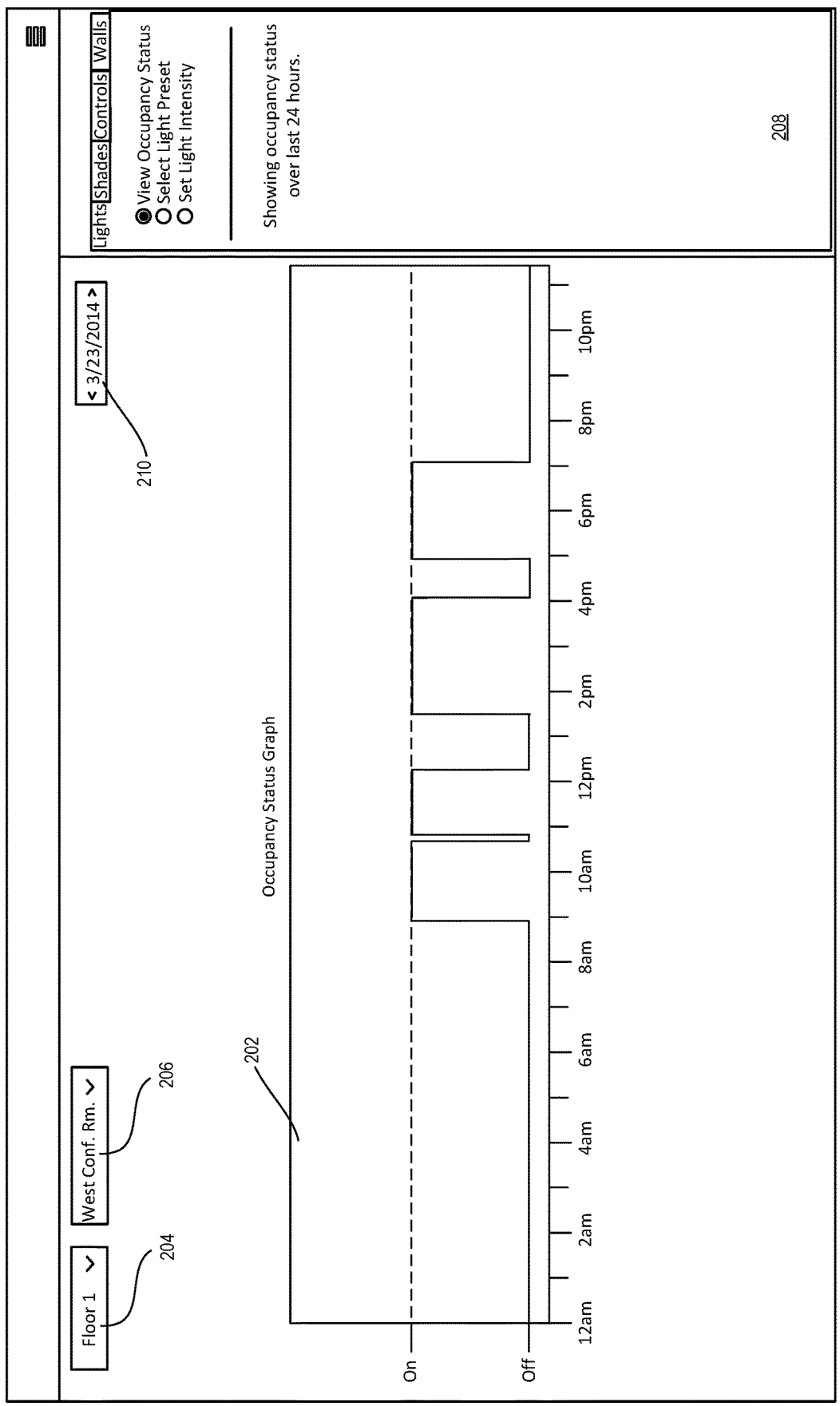
FIG. 2 depicts an example prior art user interface that includes occupancy status information that a user may view to determine an amount of energy used by a lighting load.
Figure 3:
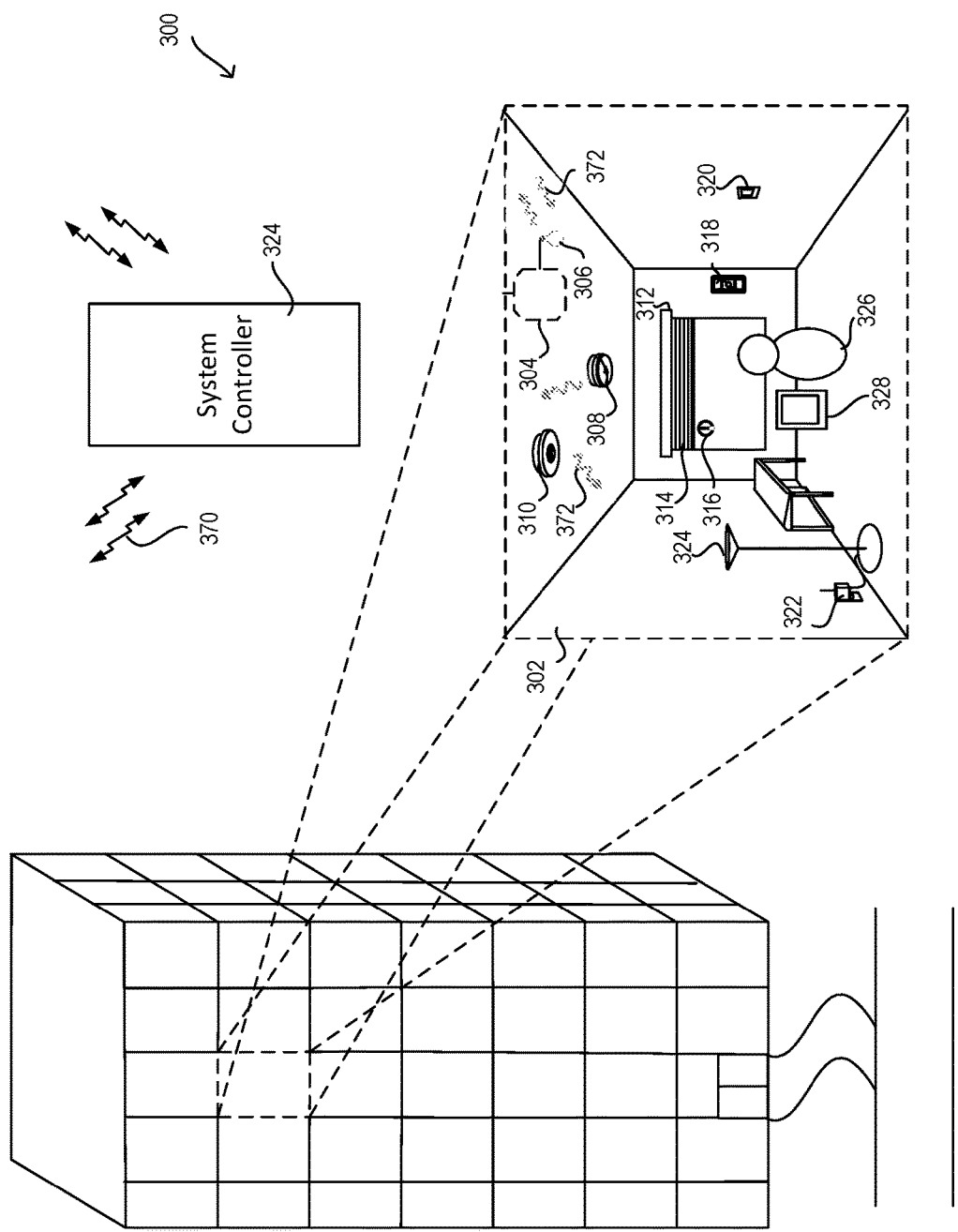
FIG. 3 illustrates an example load control system for controlling electrical loads in a load control environment.

FIG. 3 depicts an example load control system 300 for controlling electrical loads in a load control environment 302, which may be a room in a residence or an office building, for example. As shown in FIG. 3, the load control environment 302 may include various types of control devices for controlling electrical loads. The control devices may include load control devices and/or input devices. An input device may indirectly control the amount of power provided to an electrical load by transmitting digital messages to a load control device. A load control device may directly control the amount of power provided to the electrical load based on the digital messages received from an input device. The digital messages may include control instructions (e.g., load control instructions) or another indication (e.g., measurement) that causes the load control device to determine load control instructions for controlling an electrical load.

Control devices (e.g., load control devices and/or input devices) may communicate with each other and/or other devices via a wired and/or a wireless signal. For example, the load control devices may receive communications from the input devices via wired and/or wireless communications. The control devices may communicate via a radio frequency (RF) signals 372. The RF signals 372 may be presented via any known RF communication (e.g., near field communication (NFC); BLUETOOTH®; WI-FI®; a proprietary communication channel, such as CLEAR CONNECT™, etc.). A control device may be a one-way communication device capable of transmitting or receiving digital messages via the RF signals 372, or a two-way communication device capable of transmitting and receiving digital messages via the RF signals 372. A control device may be both a control-target and a control-source device.

The load control devices may include a lighting control device 304 (e.g., a dimmer switch, a ballast, or a light-emitting diode (LED) driver) for controlling an amount of power provided to a lighting load 306, a motorized window treatment 312 for controlling the position of a covering material 314, a thermostat 320 for controlling an HVAC system, and/or an alternating-current (AC) plug-in load control device 322 for controlling an amount of power provided to a floor lamp, a table lamp, or an electrical load of another device that is plugged in to the AC plug-in load control device 322. The lighting control device 304, the motorized window treatment 312, the thermostat 320, and/or the AC plug-in load control device 322 may be load control devices that may be capable of receiving and/or implementing control instructions based on load control messages received from one or more input devices. The input devices may include a daylight sensor 308, an occupancy sensor 310, a window sensor 316, and/or a remote control device 318.

The remote control device 318 may be wireless devices capable of controlling a load control device via wireless communications. The remote control device 318 may be attached to the wall or detached from the wall. Examples of remote control devices are described in greater detail in U.S. Pat. No. 5,248,919, issued Sep. 28, 1993, entitled LIGHTING CONTROL DEVICE; U.S. Pat. No. 8,471,779, issued Jun. 25, 2013, entitled WIRELESS BATTERY-POWERED REMOTE CONTROL WITH LABEL SERVING AS ANTENNA ELEMENT; and U.S. Patent Application Publication No. 2014/0132475, published May 15, 2014, entitled WIRELESS LOAD CONTROL DEVICE, the entire disclosures of which are hereby incorporated by reference.

The occupancy sensor 310 may be configured to detect occupancy and/or vacancy conditions in the load control environment 302 in which the load control system 300 is installed. The occupancy sensor 310 may transmit digital messages to load control devices via the RF communication signals 372 in response to detecting the occupancy or vacancy conditions. The occupancy sensor 310 may operate as a vacancy sensor, such that digital messages are transmitted in response to detecting a vacancy condition (e.g., digital messages may not be transmitted in response to detecting an occupancy condition). The occupancy sensor 310 may enter an association mode and may transmit association messages via the RF communication signals 372 in response to actuation of a button on the occupancy sensor 310. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 308 may be configured to measure a total light intensity in the load control environment 302 in which the load control system 300 is installed. The daylight sensor 308 may transmit digital messages including the measured light intensity via the RF communication signals 372 for controlling load control devices in response to the measured light intensity. The daylight sensor 308 may enter an association mode and may transmit association messages via the RF communication signals 372 in response to actuation of a button on the daylight sensor 308. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The window sensor 316 may be configured to measure an exterior light intensity coming from outside the load control environment 302 in which the load control system 300 is installed. The window sensor 316 may be mounted on a façade of a building, such as the exterior or interior of a window, to measure the exterior natural light intensity depending upon the location of the sun in sky. The window sensor 316 may detect when direct sunlight is directly shining into the window sensor 316, is reflected onto the window sensor 316, or is blocked by external means, such as clouds or a building, and may send digital messages indicating the measured light intensity. The window sensor 316 may transmit digital messages including the measured light intensity via the RF communication signals 372. The digital messages may be used to control an electrical load via one or more load control devices. The window sensor 316 may enter an association mode and may transmit association messages via the RF communication signals 372 in response to actuation of a button on the window sensor 316.

The load control environment 302 may include other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., power meters, energy meters, utility submeters, utility rate meters, etc.), central control transmitters, residential controllers, commercial controllers, industrial controllers, or any combination of input devices.

A system controller 324 may be used to configure, maintain, and/or store information about the load control system 300. The system controller 324 may be, for example, a server or other computing device capable of configuring, maintaining, and/or storing information about the load control system 300. A user 326 of the load control system 300, such as a building manager, resident, or occupant of the load control environment 302, for example, may access the system controller 324 via a user device 328 to configure, maintain, and/or access information about the load control system 300.

The system controller 324 may be operable to transmit and/or receive digital messages via wired and/or wireless communications. For example, the system controller 324 may be configured to transmit and/or receive the RF communication signals 372, to communicate with one or more control devices (e.g., load control devices and/or input devices). The system controller 324 may be coupled to one or more wired control devices (e.g., load control devices and/or input devices) via a wired digital communication link. The system controller 324 may be on-site at the load control environment 302 or at a remote location. Though the system controller 324 is shown as a single device, the load control system 300 may include multiple system controllers and/or the functionality thereof may be distributed across multiple devices.

The system controller 324 may also, or alternatively, communicate via RF communication signals 370 (e.g., NFC; BLUETOOTH®; WI-FI®; cellular; a proprietary communication channel, such as CLEAR CONNECT™, etc.). The system controller 324 may communicate over the Internet, or other network, using RF communication signals 370. The RF communication signals 370 may be transmitted using a different protocol and/or wireless band than the RF communication signals 372. For example, the RF communication signals 370 may be transmitted using WI-FI® or cellular signals and the RF communication signals 372 may be transmitted using another RF communication protocol, such as BLUETOOTH® or a proprietary communication protocol. The RF communication signals 370 may be transmitted using the same protocol and/or wireless band than the RF communication signals 372. For example, the RF communication signals 370 and the RF communication signals 372 may be transmitted using WI-FI® or a proprietary communication protocol.

The system controller 324 may be configured to transmit and receive digital messages between control devices. For example, the system controller 324 may transmit digital messages to the load control devices in response to the digital messages received from the input devices. The digital messages may include association information for being stored at the control devices and/or control instructions for controlling an electrical load. The control instructions may be used to control the electrical load of a load control device or to control the electrical load according to control configuration information. The system controller 324 may receive control instructions from an input device and may perform a lookup of the load control devices associated with the input device. The system controller 324 may generate the control instructions based on digital messages (e.g., measurements) received from the input devices. The system controller 324 may send digital messages that include the control instructions to the associated load control devices for controlling electrical loads.

Once an input device is associated with a load control device, the input device may send digital messages to the load control device to cause the load control device to control an amount of power provided to an electric load. For example, the associated remote control device 318 may instruct the lighting control device 304 to increase or decrease the lighting level of the lighting load 306, instruct the motorized window treatment 312 to raise or lower the covering material 314, instruct the AC plug-in load control device 322 to raise or lower the lighting level of the floor lamp 324, and/or instruct the temperature control device 320 to raise or lower the temperature in the load control environment 302. The associated occupancy sensor 310 may send similar instructions to a load control device based on the detection of movement or occupancy within the load control environment 302. The daylight sensor 308 may send similar instructions to a load control device based on the detection of a level of natural light within the load control environment 302. The window sensor 316 may send similar instructions to a load control device based on the detection of a level of natural light detected at the window sensor 316.

The control devices may perform association with the system controller 324. The control devices may send an association message to the system controller 324 and/or the system controller 324 may send an association message to the control devices. An identifier of the system controller 324 may be stored at the control devices for detecting communications from the system controller 324. An identifier of the control devices may be stored at the system controller 324 for detecting communications from the control devices.

The system controller 324 may include control configuration information according to which one or more load control devices may be controlled. For example, control configuration information may include preset configurations. The system controller 324 may generate digital messages according to the preset configurations to set a dimming level of the lighting load 306 to a predefined level, to set a level of the covering material 314 to a predefined level, to set a dimming level of the lamp 324 to a predefined level, and/or to set a temperature of the temperature control device 320 to a predefined level. Different presets may be configured to control different load control devices to control a corresponding electrical load differently. Example preset configurations may include bedtime preset for when the user 326 is going to bed, a movie watching preset for when the user 326 is watching television or a movie, an away preset for when the user 326 is away from the load control environment 302, a home preset for when the user 326 is in the load control environment 302, or other preset configurations the user 326 may define for an occasion.

The control configuration information may include zone configurations. The zone configurations may define one or more zones in which a load control device is defined for being controlled. The load control devices in different zones may be separately controlled by sending digital messages having control instructions for controlling each zone. Different zones may be identified by a zone identifier that may be stored at the system controller 324 and/or the load control devices in the zone. Each zone may be defined as a location having a zone identifier that is a location identifier. Though the zone may be described herein as a location having a location identifier, other zone configurations may be similarly implemented as described herein for locations.

The load control system 300 may include a user device 328. The user device 328 may perform wired and/or wireless communications. Examples of the user device 328 may include a wireless phone, a tablet, a laptop, a personal digital assistant (PDA), a wearable device (e.g., a watch, glasses, etc.), or another computing device. The user device 328 may be a network device operated by the user 326. The user device 328 may communicate wirelessly by sending digital messages on RF communication signals 370 (e.g., WI-FI® signals, WI-MAX® signals, cellular signals, Bluetooth signals, etc.). The user device 328 may communicate digital messages in response to a user actuation of one or more buttons on the user device 328. Examples of load control systems having WI-FI®-enabled devices, such as smart phones and tablet devices, are described in greater detail in commonly-assigned U.S. Patent Application Publication No. 2013/0030589, published Jan. 31, 2013, entitled LOAD CONTROL DEVICE HAVING INTERNET CONNECTIVITY, and U.S. Patent Application Publication No. 2014/0177469, published Jun. 26, 2014, entitled NETWORK ACCESS COORDINATION OF LOAD CONTROL DEVICES, the entire disclosures of which are incorporated herein by reference.

The user device 328 may communicate with the system controller 324 using digital messages transmitted via RF communication signals (e.g., WI-FI® signals, WI-MAX® signals, cellular signals, Bluetooth signals, etc.) to allow the user device 328 to configure, maintain, and/or store information about the load control system 300. The user device 328 may generate an application locally for displaying information received from the system controller 324 and/or receiving user input for communicating information to the system controller 324. The system controller 324 may be accessed from the user device 328 via a web interface (e.g., accessible via a web browser or other application at the user device 328), for example.

Figure 4A:
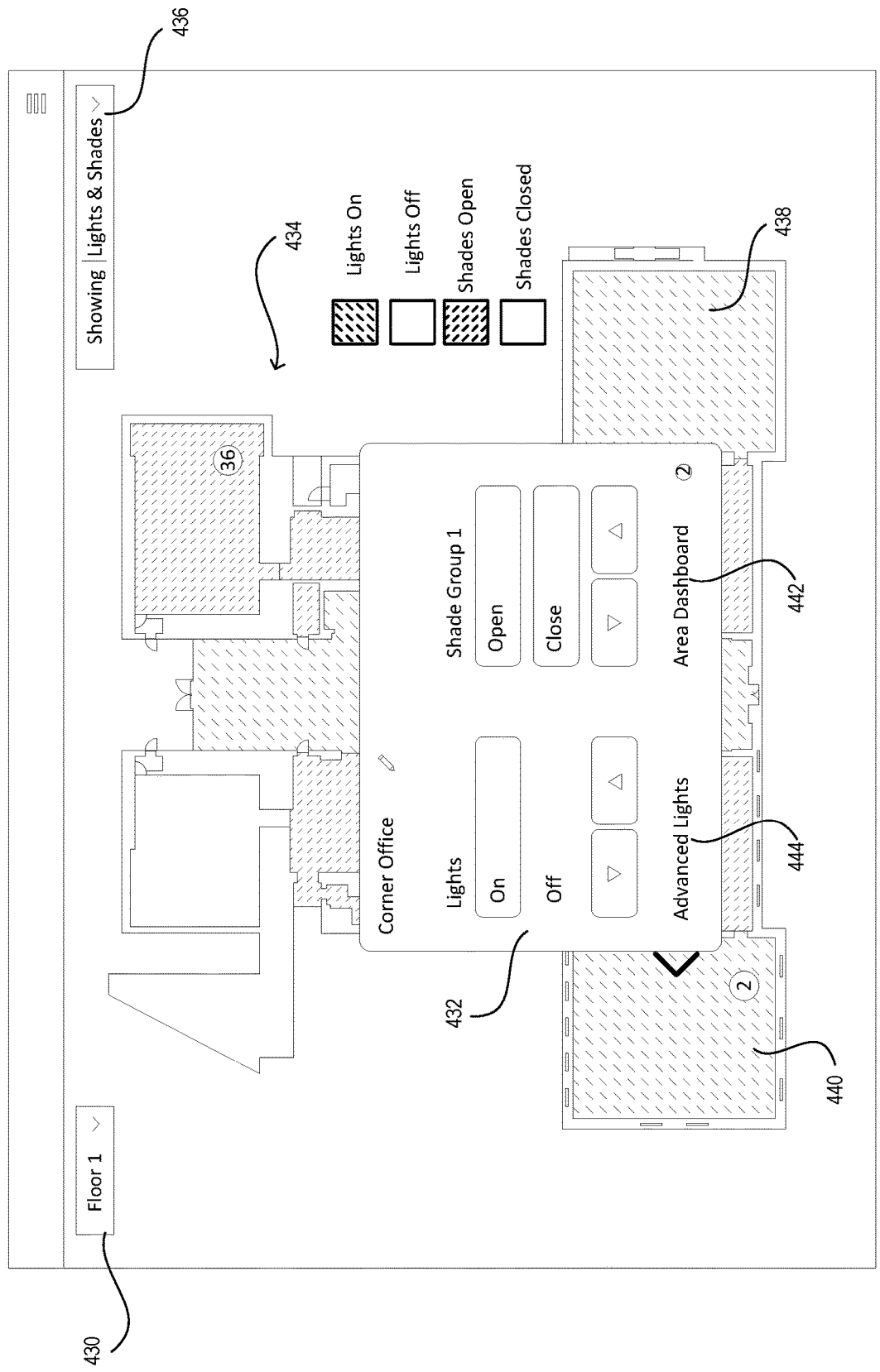
FIGS. 4A and 4B depict example user interfaces for controlling electrical loads and/or load control devices in a load control environment.

FIG. 4A depicts an example GUI 400 for controlling electrical loads and/or load control devices in a load control environment, such as the load control environment 302 shown in FIG. 3, for example. The GUI 400 may be displayed on a user device, such as the user device 328 shown in FIG. 3. The GUI 400 may include a floor plan 434 that may indicate a status of the electrical loads and/or load control devices in the load control environment. For example, the floor plan 434 may include different colors and/or textures (e.g., fill patterns) that may indicate a status of the electrical loads and/or load control devices illustrated in the floor plan 434. The different colors and/or textures in the floor plan 434 may be based on information from load control devices or other input devices (e.g., sensors, remotes, etc.). For example, different colors or textures may indicate whether the lights are on or off in an area in the floor plan 434 or whether the shades are open or closed. Different dimming levels or shade levels may be indicated with different textures, colors, shades of colors, etc.

The GUI 400 may include a floor selection menu 430 allowing a user to select a floor of a multi-floor building. The GUI 400 may include a display selection menu 436 allowing the user to select the status of load control devices and/or input devices to be displayed on the GUI 400. For example, the user may select lights, window treatments, lights and window treatments, occupancy sensor, window sensor, daylight sensor, or any combination of load control devices and/or input devices (e.g., sensors or other devices for providing input for controlling load control devices).

The GUI 400 may include information windows for displaying load control information. Load control information may include window sensor information that indicates an amount of natural light directly received at the window, weather information, global position system (GPS) information associated with the load control environment, date, time, etc. The window sensor information may indicate a direction of natural light directly received at the window and/or a direction of natural light indirectly received through reflection of natural light, diffraction of natural light, and/or the like. The information windows may display information regarding rooms or areas of the floor plan 434, such as light status, window treatment status, occupancy status, daylight level within a room (e.g., from a daylight sensor), daylight level from outside of a building (e.g., from a window sensor), etc. The computing device may receive load control information from an input device and/or a load control device and may display the load control information on the GUI 400.

Load control information displayed in information windows may comprise a load control message. The load control message may be configured to control the electrical load via an electrical load control device. The information windows may additionally allow the user to adjust controls for the electrical load control devices. For example, an information window 432 may appear when a user clicks on or selects a room in the floor plan 434. The information window 432 indicates the status of the lights in the Corner Office 440, such as upon the selection of the Corner Office 440, for example. The information window 432 allows the user to adjust the window treatment position and lighting control. The information window 432 may provide the user with an option to select an Area Dashboard link 442 or Advanced Lights link 444. Advanced Lights link 444 may display a window to allow the user to dim lights, turn on or off a subset of lights, and/or otherwise control the amount of energy provided to the lighting loads in the Corner Office 440. The Area Dashboard link 442 may display a window to allow the user to view and/or control occupancy sensors, window sensors, daylight sensors, and/or other load control devices or input devices located in the selected room. The computing device may be configured to determine, based on the load control information, the status of a lighting load in the load control environment. The computing device may be configured to display and/or provide a graphical representation indicating the status of the lighting load.

The computing device may be configured to determine, based on the load control information, the occupancy status or other input device status of the load control environment. The graphical representation may indicate the occupancy status or other input device status. The graphical representation may indicate a level of the load control of a plurality of levels of load control associated with the load control environment. The levels of load control may be identified for multiple buildings, multiple floors of a building, multiple rooms of a floor, etc. Load control information may include information associated with the load control devices or input devices of multiple buildings, multiple floors of a building, multiple rooms of a floor, etc. For example, the computing device may provide a graphical representation for load control devices or input devices for each level of load control.

Figure 4B:
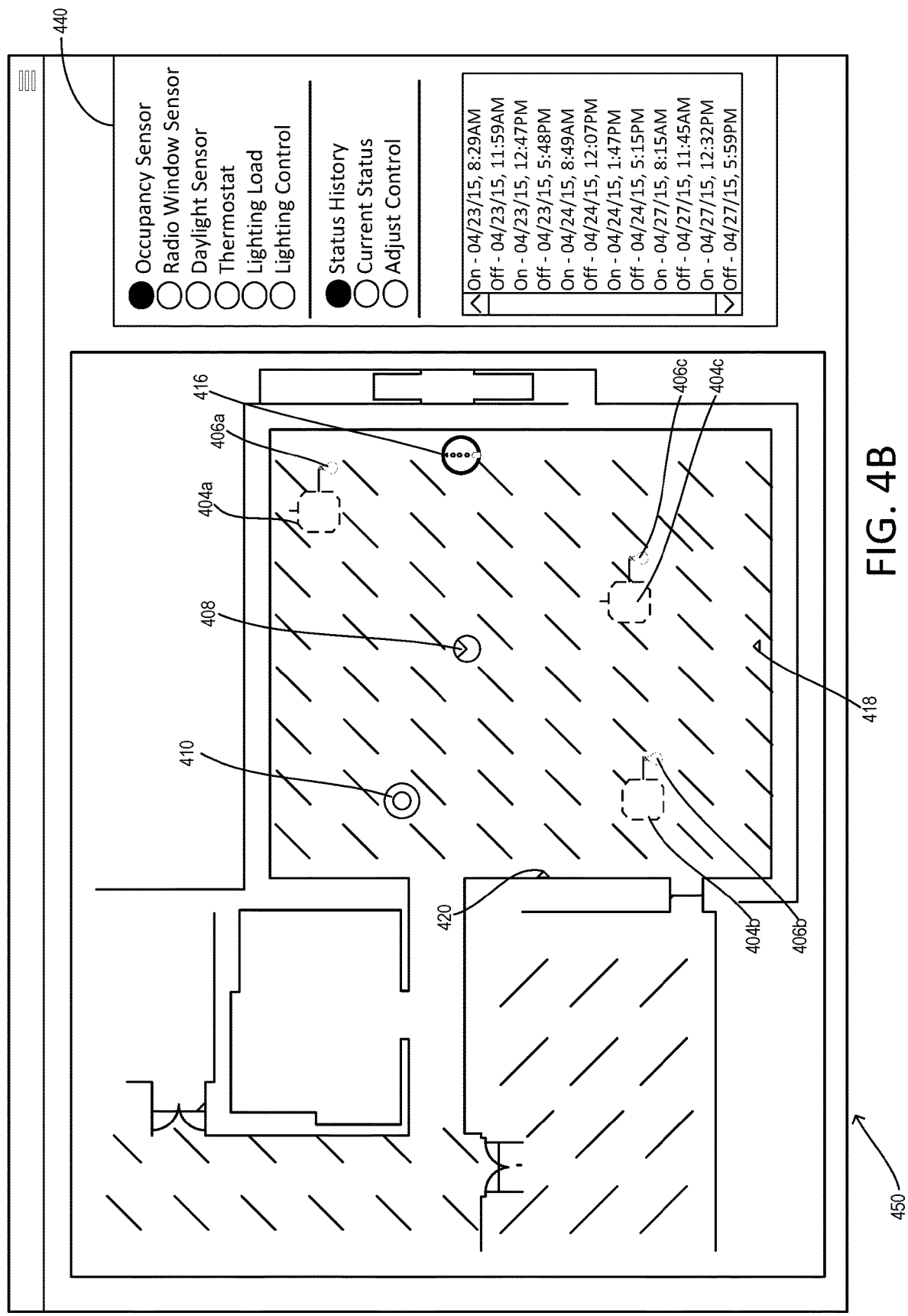

FIG. 4B depicts an example GUI 450 for displaying the status of and controlling electrical loads and/or load control devices in a load control environment. FIG. 4B illustrates a zoomed-in portion of the floor plan 434 depicted in FIG. 4A. As illustrated in FIG. 4B, a user may zoom in on a portion of the floor plan 434, such as by selecting a portion of the floor plan 434, selecting a button on the GUI 450, scrolling a mouse or other device within a portion of the floor plan 434, using a gesture recognized by the computing device (e.g., performing a multi-finger gesture on the display of the computing device) in a portion of the floor plan 434, or otherwise zooming in to a select portion of the floor plan 434 displayed on the GUI 400. A portion (e.g., 438) of the floor plan 434 may be enlarged to display details of the floor plan 434 that may be unable to be seen in the GUI 400 shown in FIG. 4A. For example, in GUI 450, the user may be able to see the location of one or more load control devices or input devices in a room. The GUI 450 displays the occupancy sensor 410, a window sensor 416, daylight sensor 408, thermostat 420, lighting loads 406*a-c*, lighting control devices 404*a-c*, and remote control device 418. For example, the lighting control devices 404*a-c* and the lighting loads 406*a-c* may represent a lighting fixture in the load control environment.

On the GUI 450, the occupancy sensor 410, window sensor 416, daylight sensor 408, thermostat 420, lighting loads 406*a-c*, lighting control devices 404*a-c*, or remote control device 418 may be selected, for example, by clicking on the icon on the GUI 450 in the room or by clicking the corresponding button in selection window 440. By selecting an option, the user may be able to view information related to the selected option, such as status history or current status, or control features of the selected option. For example, if the occupancy sensor 410 option is selected, the user may be given the further option of viewing the status history of the occupancy sensor 410, viewing the current status of the occupancy sensor 410, or adjusting the controls of the occupancy sensor 410. If the status history for the occupancy sensor option is selected, the user may view a list of when the occupancy sensor 410 identified an occupancy condition or a vacancy condition for a given time period. The status of the occupancy sensor 410 may include the current status of the battery power and/or whether the occupancy sensor 410 is currently sensing occupancy in a room. If the lighting control devices 404*a-c* option is selected, the user may be given the option to adjust the dimming level of the lighting control device, view the status history of the dimming level of the lighting control, or view the current status of the lighting control device. Though the lighting control devices 404*a-c* and the occupancy sensor 410 are provided as examples, similar options may be provided for any load control device or input device.

The GUI 450 may include an option to zoom out to the floor plan 434, such as by selecting a button on the GUI 450, scrolling a mouse or other device within a portion of the floor plan, using a gesture recognized by the computing device (e.g., performing a multi-finger gesture on the display of the computing device) in a portion of the floor plan, or otherwise zooming out to the floor plan 434 displayed on the GUI 400. A multi-finger gesture on the display of the computing device may be recognized at the computing device when a user pinches their fingers together and separates them on the display of the computing device to zoom in. A computing device may similarly recognize a user moving their fingers closer together on the display to zoom out.

A computing device may be configured to receive load control information from load control devices and input devices to enable display of the status and/or enable control of motorized window treatments (e.g., shades) in the load control environment. The motorized window treatments may be controlled according to an automated system. An example of a load control system for controlling one or more motorized window treatments automatically according to a timeclock schedule is described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference. The computing device may be configured to determine, based on the load control information, an amount of natural light allowed in a load control environment. Load control information may also include window sensor information that indicates that amount of natural light directly received at the window, weather information, GPS information associated with the load control environment, date, time, etc. The computing device may be configured to provide a graphical representation of the amount of natural light allowed in the load control environment based on the load control information. The computing device may be configured to display the graphical representation on a graphical user interface.

Figure 5:
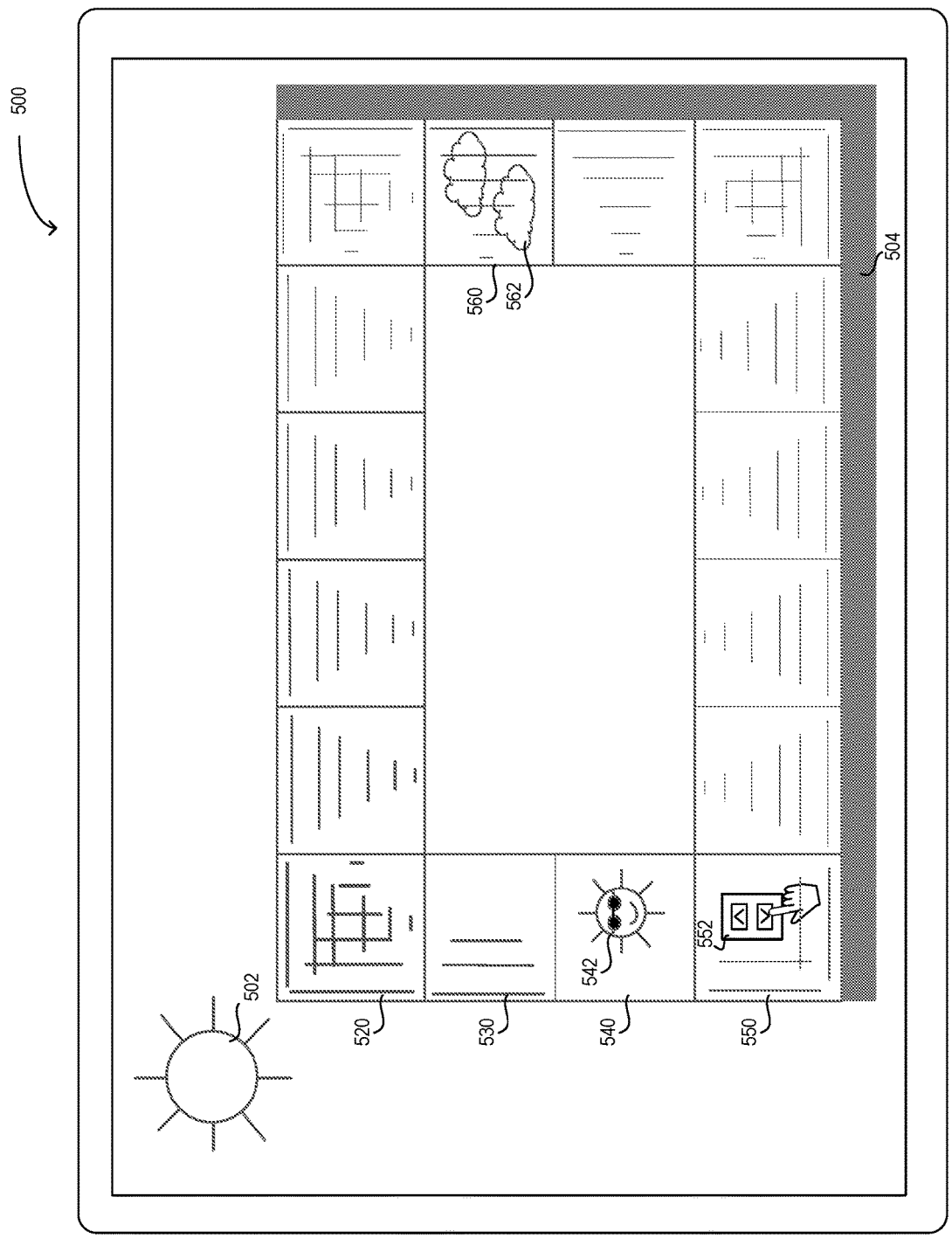
FIG. 5 depicts an example user interface for viewing status of and/or controlling electrical loads and/or load control devices in a load control environment.

FIG. 5 depicts an example GUI 500 for viewing and/or controlling electrical loads and/or load control devices in a load control environment. In FIG. 5, the GUI 500 may utilize representative boxes that may indicate rooms on a floor of a building, such as rooms 520, 530, 540, 550, and 560, or other discrete areas of a load control environment. The GUI 500 may indicate the position of the sun relative to the load control environment. The position of the sun may be indicated with a sun icon 502. The location of the sun icon 502 may be based on the time of day, the time of year, the location of the load control environment, and/or information from one or more sensors (e.g., daylight sensors, window sensors, etc.) capable of measuring an amount of natural light. The GUI 500 may indicate the location of the building (e.g., a global position system information) and the location of the rooms in the building relative to the sun. For example, room 520 is a corner room closest to the sun at the present time in the GUI 500. The GUI 500 may indicate the portions of the building that are shaded with a building shadow icon 504. The building shadow icon 504 may be indicated as being on a portion of the building opposite the sun icon 502. The GUI 500 may represent real-time information or information at a select period of time.

The GUI 500 may indicate the position of the window treatments in each room, as well as the amount of natural light received by each room. For example, the graphical depiction of the natural light in each room may indicate the representative distance of the natural light into the room. The graphical depiction in each room may indicate the representative distance of the natural light into a room by a number of dashed lines in a gradient, but the distance of the natural light may similarly be indicated with a solid color or other pattern. The graphical depiction may represent the amount of natural light and/or a position of the covering material. As the dashed lines go further into the room, the width of the lines is shortened on each side to simulate the distance of actual natural light into a room and the amount of natural light in each portion of the room.

Additionally, or alternatively, the room may include a graphical depiction of the position of the covering material. The graphical depiction of the position of the covering material may illustrate the position of the covering material from a side of the room by covering a percentage of the room with the graphical depiction of the covering material. The entire room being covered by the graphical depiction of the covering material may indicate that the covering material is in the fully-closed position. The entire room being open without the graphical depiction of the covering material may indicate that the covering material is in the fully-open position.

The length of the gradient into the room represents the amount and/or distance of the natural light into the room (e.g., the penetration distance of the direct sunlight in the room) as well as the position(s) of the motorized window treatment(s) in the room. For example, in room 520, the gradient extends entirely into the room, depicting that the window treatment is fully open, whereas in room 530, the gradient extends partially into the room, depicting that the window treatment is partially closed. The length of the gradient may be based on status information received from the window treatment, other input devices (e.g., daylight sensors indicating amount of daylight into the room, window sensors indicating the amount of daylight being received, etc.), and/or automated window treatment control information (e.g., the time of day, the shade level at the time of day, the location of the sun at the time of day, etc.). Alternatively, the length of the gradients into the room may represent the position of the covering material.

The length of each gradient across the room may represent a percentage of natural light directly or indirectly received in a room. For example, the length of the gradient may represent a quantified light intensity. Longer gradients may represent a higher percentage of light, while shorter gradients may represent a lower percentage of light. Each gradient may indicate the same percentage of light difference within the room, while the number of gradients indicate the total light intensity, which may be quantifiable by the number of gradients, the length of the gradients, and/or the percentage of light represented by each gradient. The quantified intensity of the natural light in each room may be based on a measured light intensity level at the windows of each room (e.g., using the window sensor) and/or the distance of each room from the location of the sun. The intensity of the natural light may be indicated based on sensor information (e.g., daylight sensors), status information received from the window treatment, and/or other input devices. The quantified intensity of the natural light indicated by the length of the gradient may be based on status information received from the window treatment, other input devices (e.g., daylight sensors indicating amount of daylight into the room, window sensors indicating the amount of daylight being received, etc.), and/or automated window treatment control information (e.g., the time of day, the shade level at the time of day, the location of the sun at the time of day, etc.).

The position of the covering material of a motorized window treatment may be represented by the amount of free space or white space in a room. For example, if the room is blank or is a single color, then a motorized window treatment may be fully closed. The room 540 may represent a room in which the motorized window treatment may be in the fully-closed position (e.g., which may be consistent with the bright override mode). In room 530, the shades may be at approximately 50% closed. The position of the covering material may be represented by the length of the gradients into the room.

The graphical depiction of the natural light in a room may indicate the representative intensity of the natural light in the room. For example, the thickness of the lines in the gradient in each room in FIG. 5 represents the intensity level of natural light received by the room. As shown in the GUI 500, the lines in the graphical depiction in room 520 are thicker than the lines in the graphical depiction in room 550. The intensity of the natural light in each room may be based on a measured light intensity level at the windows of each room (e.g., using the window sensor) and/or the distance of each room from the location of the sun. Though the intensity of the natural light is indicated with thicker lines, the intensity may be otherwise indicated (e.g., by change of color, shade of color, etc.). The intensity of the natural light may be indicated based on sensor information (e.g., daylight sensors), status information received from the window treatment, and/or other input devices. The intensity level indicated by the gradient may be based on status information received from the window treatment, other input devices (e.g., daylight sensors indicating amount of daylight into the room, window sensors indicating the amount of daylight being received, etc.), and/or automated window treatment control information (e.g., the time of day, the shade level at the time of day, the location of the sun at the time of day, etc.).

The computing device may be configured to determine, based on information from one or more devices in the load control environment (e.g., a floor of a building, a location of the sun, a time of day, sensor information, etc.) a status of the automated window treatment control and may indicate the status of the automated window treatment control (e.g., at the system controller) in the GUI 500. For example, the automated window treatment control system may enter a bright override mode when the room is receiving direct daylight from the sun above a predefined threshold. In the bright override mode, the automated window treatment control system may set the window treatments in a room to a predefined level (e.g., half way down) to prevent direct glare and/or allow daylight to enter the room. The automated window treatment control system may set a dark override mode when the room is determined to be receiving daylight below a minimum threshold and is not directly receiving daylight from the sun (e.g., in a shadow). In the dark override mode, the automated window treatment control system may set each of the window treatments in a room to a predefined level (e.g., a fully-open position) to allow more daylight in the room, as a user may not receive direct sunlight glare. When a user manually overrides the automated window treatment control system (e.g., by pressing a button on a remote control or physically adjusting the level of the window treatment), the automated window treatment control system may enter a manual override mode.

The user may manually override the automated window treatment control system by controlling the motorized window treatments in a space manually (e.g., via a remote control device or on the user device). The user may manually override the automated window treatment control system by selecting a location within the rooms to which the user would like the shades to be controlled. For example, the user may move the shades in the room 530 to the fully-open position by selecting the wall to the far right. The user may move the shades in the room 530 to the fully-open position by selecting the wall to the left right. The user selections between the fully-open position and the fully-closed position may be identified within a predefined location between the far left wall and the far right wall (e.g., a predefined segment surrounding the gradient positions).

The computing device may be configured to provide a graphical representation of the status of the automated window treatment control system. The computing device may be configured to detect the override of the automatic control of the window treatments (e.g., or any load control device) and may provide a graphical representation on GUI 500 of an override. The load control device may be configured to detect the override of the automatic control of the window treatments (e.g., or any load control device) that may be caused by a digital message from a window sensor. A window sensor may indicate and/or sense the amount of natural light directly received at the window through which the natural light is allowed. The load control system may be configured to provide a graphical representation of the override caused by the digital message from the window sensor. The override of the automatic control may be based on an indication that an amount of cloud cover has caused the natural light to fall below a predefined threshold (e.g., dark override mode). The override of the automatic control may be based on an indication that an amount of direct sunlight has caused the natural light to rise above a predefined threshold (e.g., bright override mode).

Based on the determined status of the automated window treatment control system, the GUI 500 may depict in which rooms bright override mode is activated. Bright override mode may activate when the level of brightness in a room reaches a predefined threshold, thereby causing the window treatments to lower to a predetermined point (e.g., to a fully-closed position). A bright override icon may indicate the room in which bright override mode is activated. For example, the bright override icon 542 (e.g., sun icon) in GUI 500 may indicate that bright override mode is activated in the room 540. The computing device may also be configured to detect the manual override of the automatic control of the window treatments. The GUI 500 may depict in which room a manual override of the window treatment position has occurred. This manual override may be depicted by a manual override icon 552 (e.g., remote control device icon), such as shown in room 550. The GUI 500 may depict in which room dark override mode is activated. A dark override icon may indicate the room in which dark override mode is activated. For example, the dark override icon 562 (e.g., cloud icon) in GUI 500 may indicate that dark override mode is activated in room 560.

A computing device may be configured to access a historical record of load control information. The load control information may include the status of the electrical load, the status of the load control device (e.g., motorized window treatments, lights, etc.), and/or the status of an input device (e.g., sensors, remote control device, etc.) in the load control environment. For example, historical records of lighting control and occupancy information may be displayed on the graphical representation. The computing device may be configured, for example, to receive an indication of a time or time period associated with occupancy sensor activity in the historical record of the load control information. The computing device may display a graphical representation depicting lighting load activity based on the occupancy sensor activity in the load control environment at the time or over the time period.

Figure 6A:
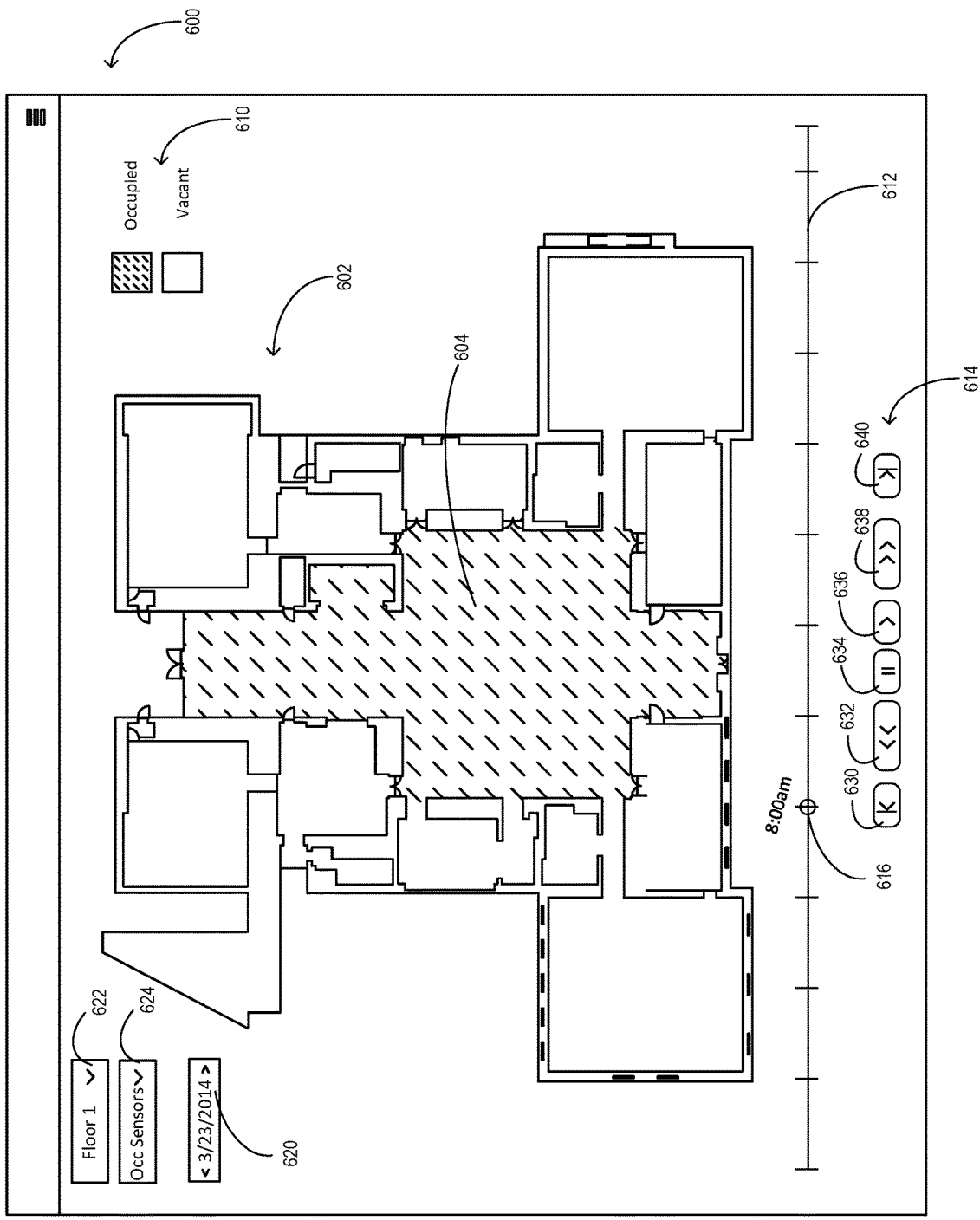
FIGS. 6A-6C depict example user interfaces for viewing a historical record of the status of electrical loads, load control devices, and/or input devices in a load control environment.
Figure 6B:
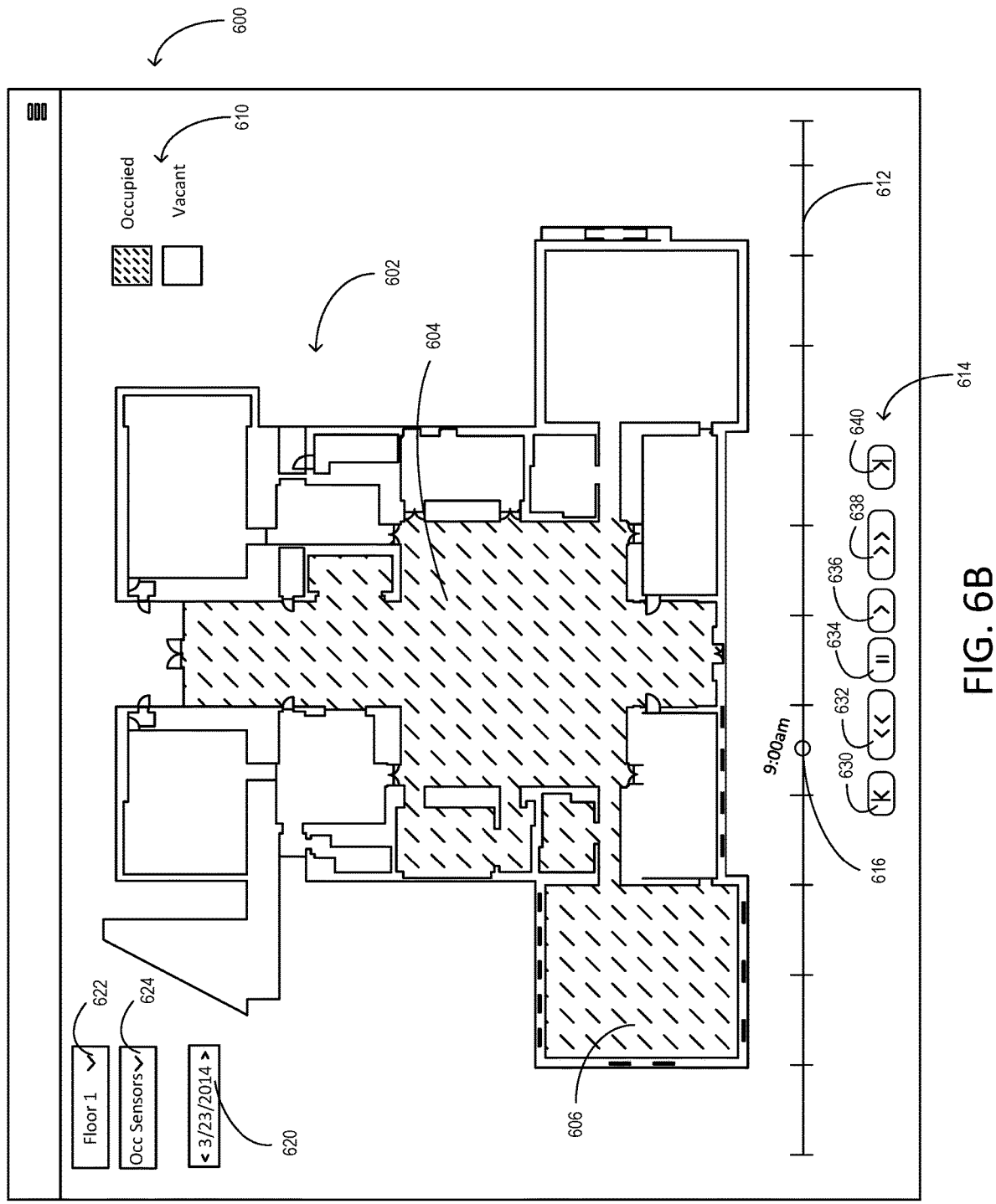
Figure 6C:
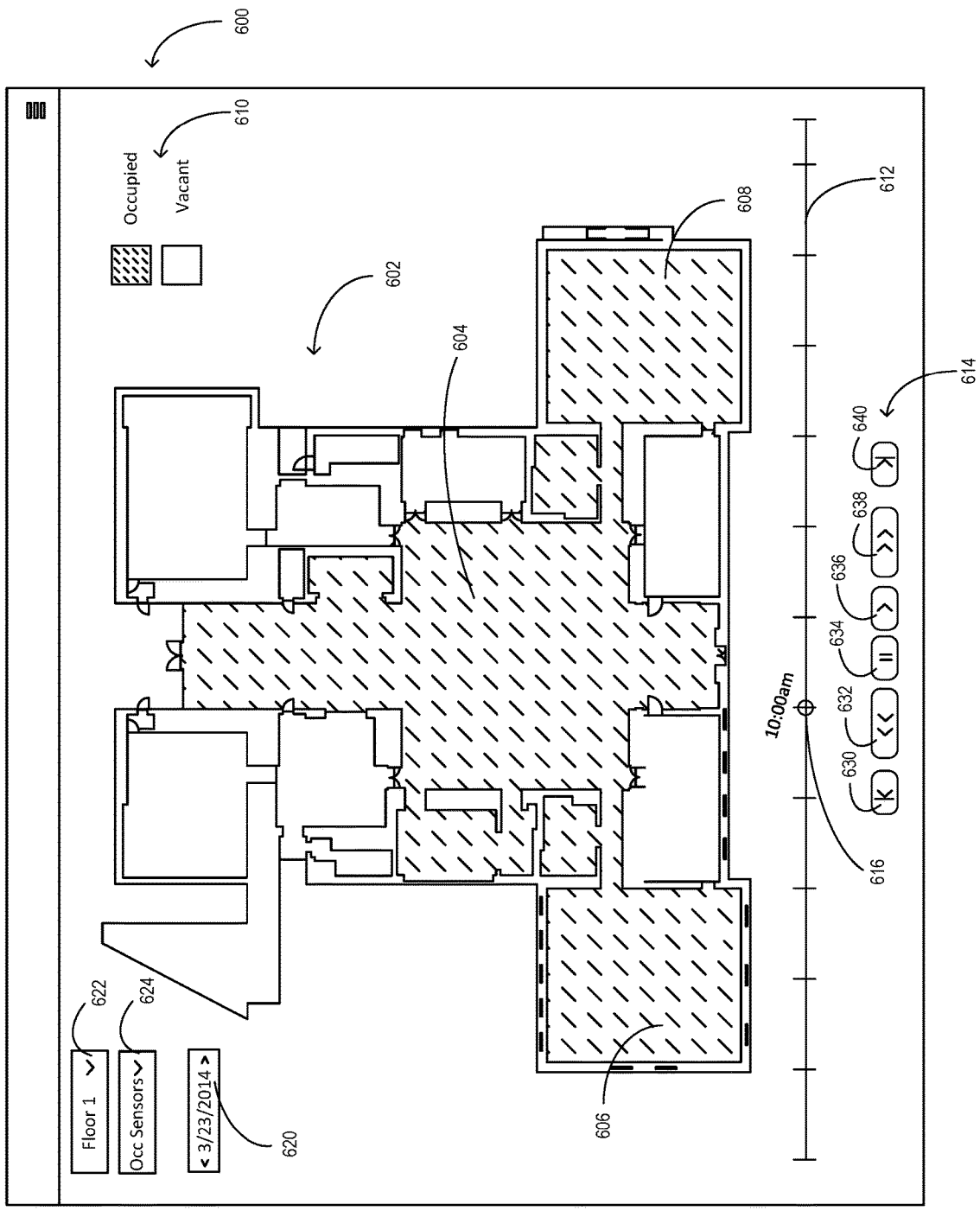

FIGS. 6A-6C depict an example GUI 600 for viewing a historical record of the status of electrical loads and/or load control devices in a load control environment. In FIG. 6A, the GUI 600 may display a floor plan 602 for a selected time. The floor plan may display the occupancy of the areas and/or rooms of the floor plan 602, the lighting of the areas and/or rooms of the floor plan 602, etc. The GUI 600 may include a floor selection menu 622 that may be operable for the user to select which floor of a multi-floor building to be displayed. For example, in FIG. 6A, floor 1 is selected in the floor selection menu 622. The GUI 600 may include a date selection menu 620 that may be operable to allow selection of the date for which the status of the devices in the floor plan 602 may be displayed. For example, in FIG. 6A, Mar. 23, 2014 is selected in the date selection menu 620. The GUI 600 may include a display selection menu 624 that may be operable to allow selection of the input device information and/or load control information to be displayed. The display selection menu 624 may enable selection of whether to display lights information, occupancy information, energy usage and/or savings information, etc. For example, the lights tab may be selected in the display selection menu 624 to view lighting information and/or control the lighting loads in the load control environments in the load control system. The occupancy tab may be selected in the display selection menu 624 to view occupancy information and/or control the occupancy sensors in the load control environments in the load control system. For example, in FIG. 6A, the occupancy tab is selected for showing occupancy status indicated by the occupancy sensors.

The GUI 600 may include a legend 610 that defines the representation of different colors, patterns, icons, and/or other differentiating indicators on the floorplan 602. As shown in GUI 600, the legend 610 defines the patterns for spaces that are occupied and vacant in the floorplan 602. If the lights tab is selected in the display selection menu 624, in addition to or as an alternative to the occupancy tab, lighting indicators may be included in the legend 610 and the floorplan 602.

The GUI 600 may be operable to allow playback of the status of selected load control devices and/or input devices at a selected time or time period. For example, a user may select a specific time 616 on timeline 612 for which the occupancy information will be displayed for the floor plan 602. As shown in FIG. 6A, 8:00 am is selected. The GUI 600 may include a control panel 614 that includes controls for controlling the playback of the status of the selected load control devices and/or input devices. The controls in the control panel 614 may include a rewind button 632 to allow a user to rewind, a fast-forward button 638 to allow the user to fast-forward, a skip forward button 640 to allow the user to skip ahead a predefined period of time, and/or a skip back button 630 to allow the user to skip back a predefined period of time to show the status of the selected load control devices and/or input devices at different times. The control panel 614 may include a play button 636 that may allow a user to play back the status of the selected load control devices and/or input devices over a period of time. The control panel 614 may include a pause button 634 that may allow a user to pause the playback of the status being shown or select a time on the timeline 612 at which the user would like to display the status of the selected load control devices and/or input devices.

In FIG. 6A, the floor plan 602 depicts occupancy at 8:00 am on Mar. 23, 2014. At this selected time 616, the floor plan 602 indicates that occupancy sensors in the main corridor 604 were activated and the lights in the main corridor 604 were on. FIG. 6B depicts an example of the GUI 600 at a later period in time. In FIG. 6B, the floor plan 602 depicts the status of the lights (e.g., controlled in response to the occupancy sensors) on Mar. 23, 2014 at a selected time 616 of 9:00 am. As indicated in FIG. 6B, additional room 606 has been occupied and the lights in room 606 have been turned on in the floor plan 602. The user may individually select the two times shown in FIGS. 6A and 6B or playback the status of the devices between the periods of time in FIGS. 6A and 6B, or any portion thereof.

In FIG. 6C, the floor plan 602 depicts an example of the GUI 600 at a later period of time than in FIG. 6B. The GUI 600 shows the status of the lights on Mar. 23, 2014 at the selected time 616 of 10:00 am. As indicated in FIG. 6C, additional room 608 has been occupied and additional lights in room 608 has been turned on from the depiction of floor plan 602 in FIGS. 6A and 6B. A user may scroll through time periods, or play a visual representation of the status of selected load control devices and/or input devices for the floor plan 602 to determine how to improve energy efficiency in a load control environment. The indications shown in the floorplan 602 may indicate inefficient use of energy at different periods of time, (e.g., energy usage when a room is unoccupied. For example, a user may wish to determine unoccupied areas of a building that may be using energy in an inefficient manner. The user may determine areas used most and least frequently in a floor plan to plan for energy usage. The user may use the GUI 600 for security purposes to determine areas of occupancy or use at different periods of time.

The historical record of the status of the load control devices and/or input devices may be stored at the computing device from status information received from the devices. Though FIGS. 6A-6C show that status of occupancy and lights controlled by the occupancy sensors, the status of the devices alone may be displayed. The status of other load control devices and/or input devices may similarly be displayed based on feedback information received at the computing device. Where an automated window treatment control system is implemented, the computing device may receive window treatment status information from the automated window treatment control system for displaying the status of the motorized window treatments at a selected period of time.

Figure 7A:
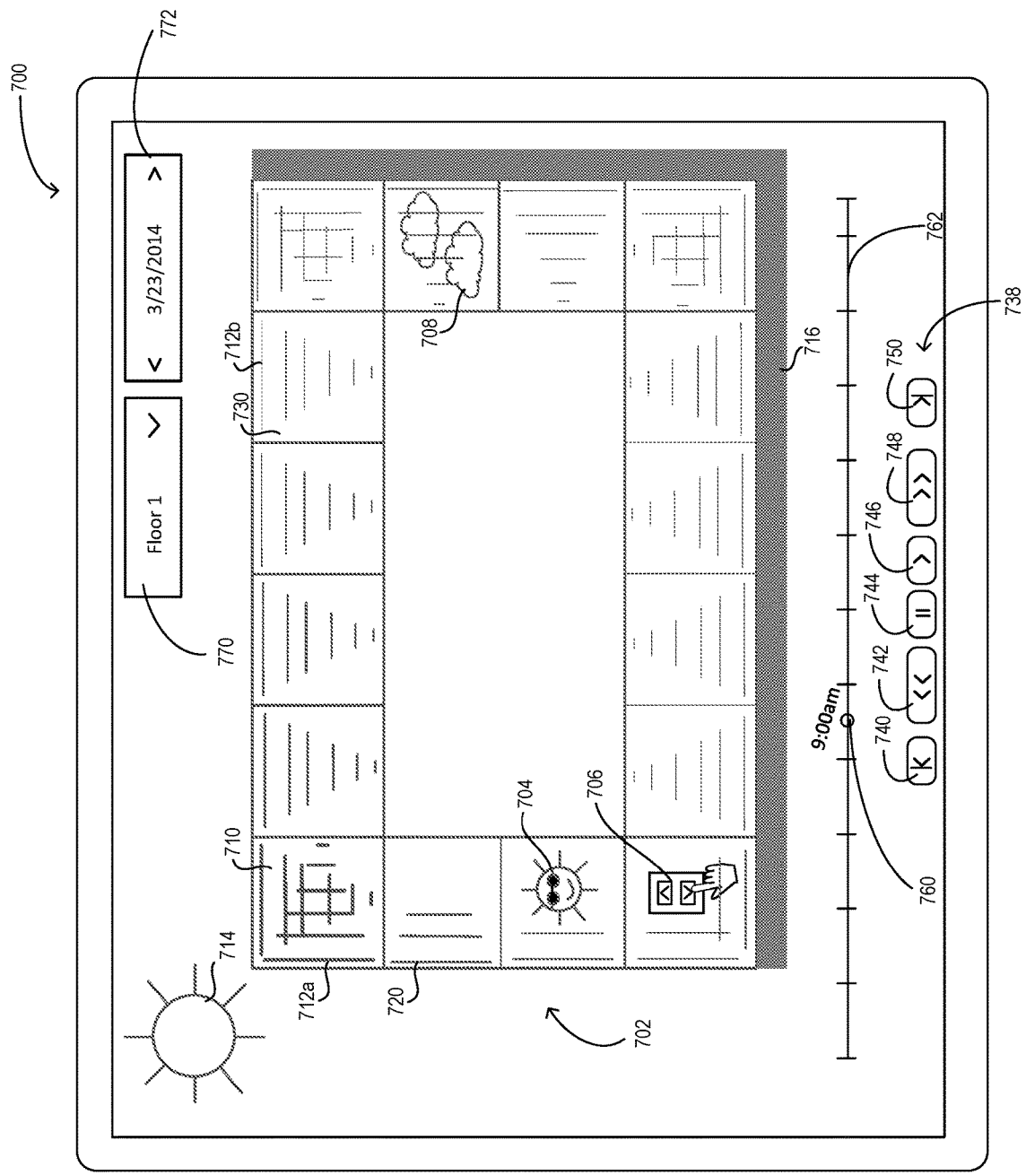
FIGS. 7A-7C depict example user interfaces for viewing a historical record of the status of motorized window treatments and/or an automated motorized window treatment control system in a load control environment.
Figure 7B:
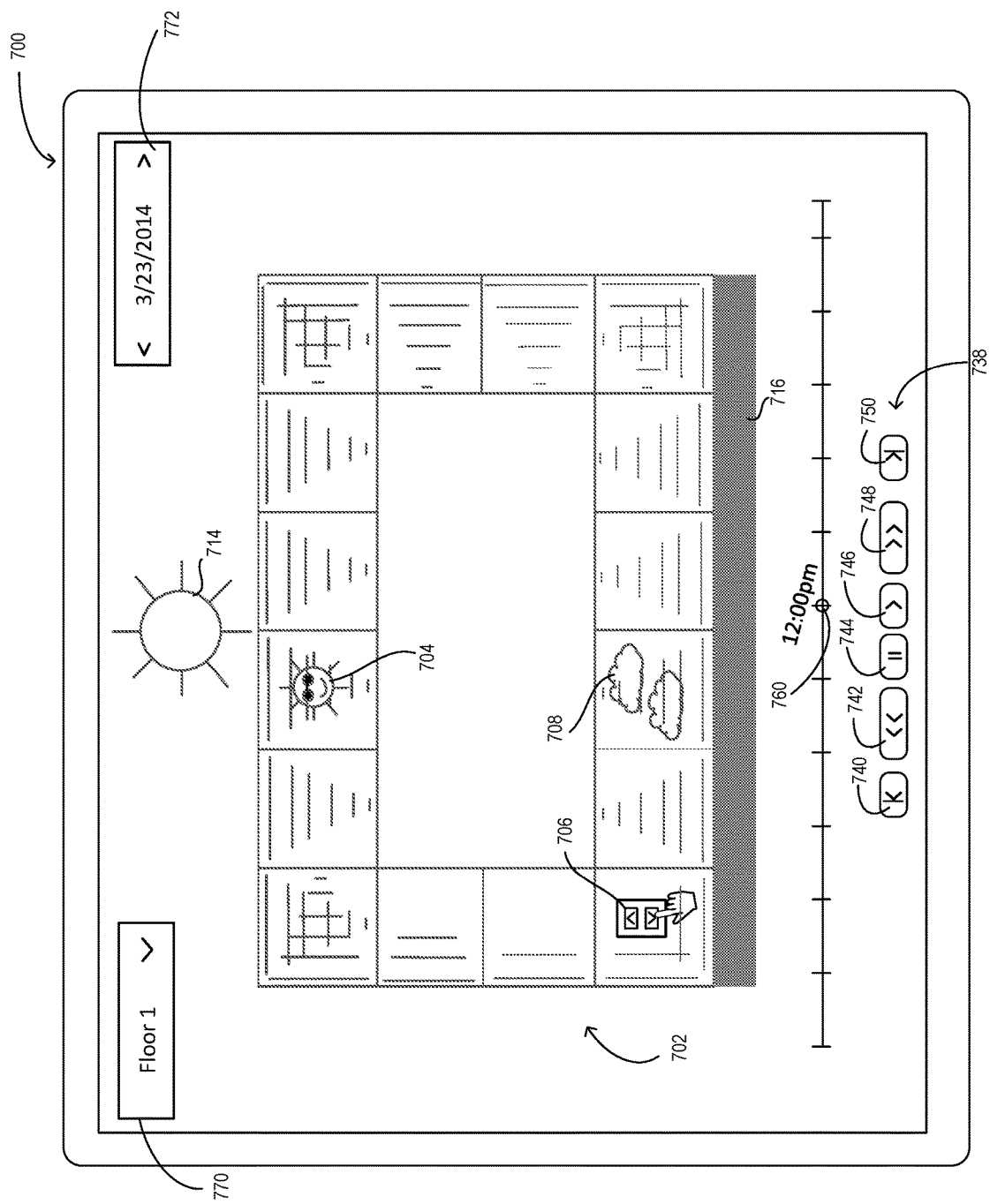
Figure 7C:
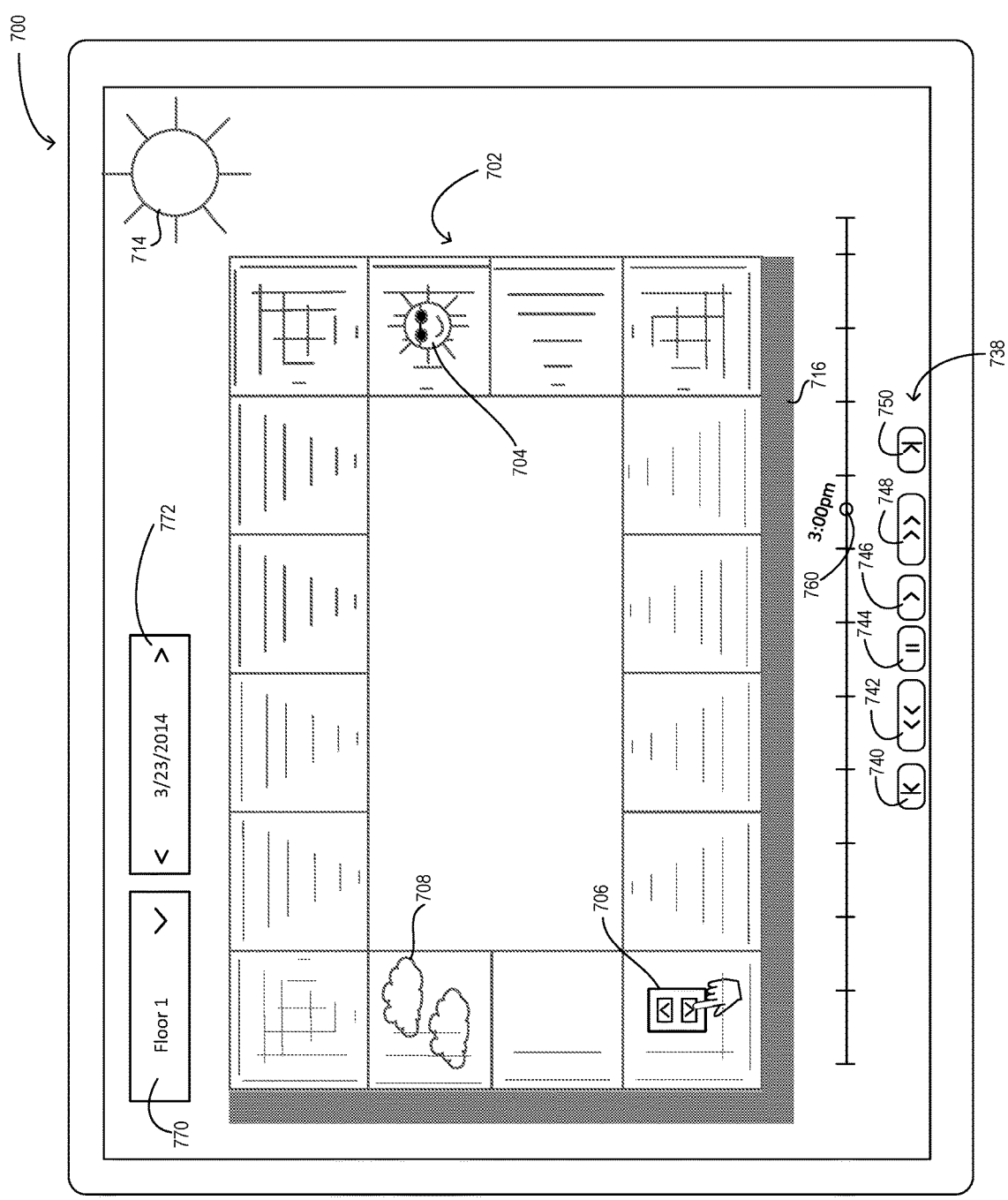

FIGS. 7A-7C depict an example GUI 700 for viewing the status of motorized window treatments in an automated window treatment control system. In FIG. 7A, the GUI 700 may display a floor plan 702 for a selected time 760 on a timeline 762. The floor plan 702 may display the window treatment level for the areas and/or rooms of the floor plan 702. The GUI 700 may include a floor selection menu 770 that may be operable for the user to select which floor of a multi-floor building to be displayed. For example, in FIG. 7A, floor 1 is selected in the floor selection menu 770. Though a floor selection menu may be described herein, a selection menu may be provided for identifying other types of load control environments that may be displayed in a GUI, such as rooms, portions of rooms, buildings, types of rooms in a building, a series of floors, etc.

The GUI 700 may include a date selection menu 772 that may be operable to allow selection of the date for which the floor plan 702 may be displayed. For example, in FIG. 7A, Mar. 23, 2014 is selected in the date selection menu 772. The GUI 700 may include a timeline 762 that may be operable to allow selection of a specific time 760 for which the window treatment level for the areas and/or rooms of the floor plan 702 may be displayed. For example, in FIG. 7A, the time 760 indicates a selection of 9:00 am.

The GUI 700 may include a control panel 738 that includes controls for controlling the playback of the status of the motorized window treatment information. The controls in the control panel 738 may include a rewind button 742 to allow a user to rewind, a fast-forward button 748 to allow the user to fast-forward, a skip forward button 750 to allow the user to skip ahead a predefined period of time, and/or a skip back button 740 to allow the user to skip back a predefined period of time to show the status of the motorized window treatment information at different times. The control panel 738 may include a play button 746 that may allow a user to play back the status of the motorized window treatment information. The control panel 738 may include a pause button 744 that may allow a user to pause the playback of the motorized window treatment information being shown or select a time on the timeline 762 at which the user would like to display the motorized window treatment information.

In FIG. 7A, at this selected time, the floor plan 702 indicates that the level of the covering material for the motorized window treatments in each room are at least partially down, if not in the fully-closed position. In room 710, the window treatments may be in the fully-closed position and the daylight intensity may be at a high intensity, as indicated by the thickness of the gradient. For example, the line 712a is thicker than the line 712b, indicating that room 710 has greater light intensity than room 730 (e.g., gradients reflect the light intensity of a room). In room 720, the sunlight is entering the room at a lesser intensity due to the greater distance of the room from the sun, as indicated by the thinner lines in the gradient in room 720. The level of the covering material is also higher in the room 720, as the covering material is indicated as being partially closed. The GUI 700 also shows the status of the automated window treatment control system, as the rooms being controlled according to different override modes (e.g., bright override mode indicated by the bright override icon 704, manual override mode indicated by the manual override icon 706, and dark override mode indicated by the dark override icon 708) are indicated in the GUI 700. The GUI 700 also shows the position of the sun indicated by sun icon 714 and shaded portions of the building indicated by the building shadow icon 716 relative to the sun at the selected time. The display of the information in the GUI 700 is efficiently displayed for identifying the status of various control devices at a selected time or over a period of time.

In FIG. 7B, the floor plan 702 depicts the window treatment level and the status of the automated window treatment control system at a later period in time. The status of the window treatment level and the status of the automated window treatment control system in FIG. 7B is shown for a selected time 760 of 12:00 pm on Mar. 23, 2014. At this selected time 760, the floor plan 702 indicates that the covering material for the window treatments are at least partially down in each of the rooms. As shown in FIG. 7B, the sun is at a different position from the position shown in FIG. 7A, which is reflected by the position of the sun icon 714, causing the sunlight to hit the windows with a different intensity from what is depicted in FIG. 7A, which is reflected by the gradients. The building shadow icon 716 is also updated to reflect the shade position on the building in FIG. 7B according to the position of the sun at the selected time 760. FIG. 7B also reflects a change in the status of the automated window treatment control system, as the rooms being controlled according to different override modes have changed in the GUI 700. For example, the bright override mode indicated by the bright override icon 704 and the dark override mode 708 indicated by the dark override icon 708 have been activated in different rooms.

In FIG. 7C, the floor plan 702 depicts window treatment level and the status of the automated window treatment control system at a later period in time than the time identified in FIG. 7A or 7B. The status of the window treatment level and the status of the automated window treatment control system in FIG. 7B is shown for a selected time 760 of 3:00 pm on Mar. 23, 2014. At this selected time 760, the floor plan 702 indicates that the covering material for the window treatments are at least partially down in each of the rooms. As shown in FIG. 7C, the sun is at a different position than the position shown in FIGS. 7A and 7B, which is reflected in the position of the sun icon 714. The change in the position of the sun causes the sunlight to hit the windows with a different intensity from what is depicted in FIG. 7A or 7B, which is reflected by the gradients. The shade position on the building, which is reflected by the building shadow icon 716, is also updated in FIG. 7C to reflect the shade on different sides of the building according to the position of the sun at the selected time 760. FIG. 7C also reflects a change in the status of the automated window treatment control system, as the rooms being controlled according to different override modes have changed in the GUI 700. For example, the bright override mode indicated by the bright override icon 704 and the dark override mode 708 indicated by the dark override icon 708 have been activated in different rooms.

As shown in FIGS. 7B and 7C, the position of different objects in the GUI 700 may be reoriented based on the change in the position of the status information being displayed in the GUI 700. For example, the floor selection menu 770 and/or the date selection menu 772 is moved in FIGS. 7B and 7C from the position in FIG. 7A to maximize the display area for indicating the status information being displayed.

Figure 8A:
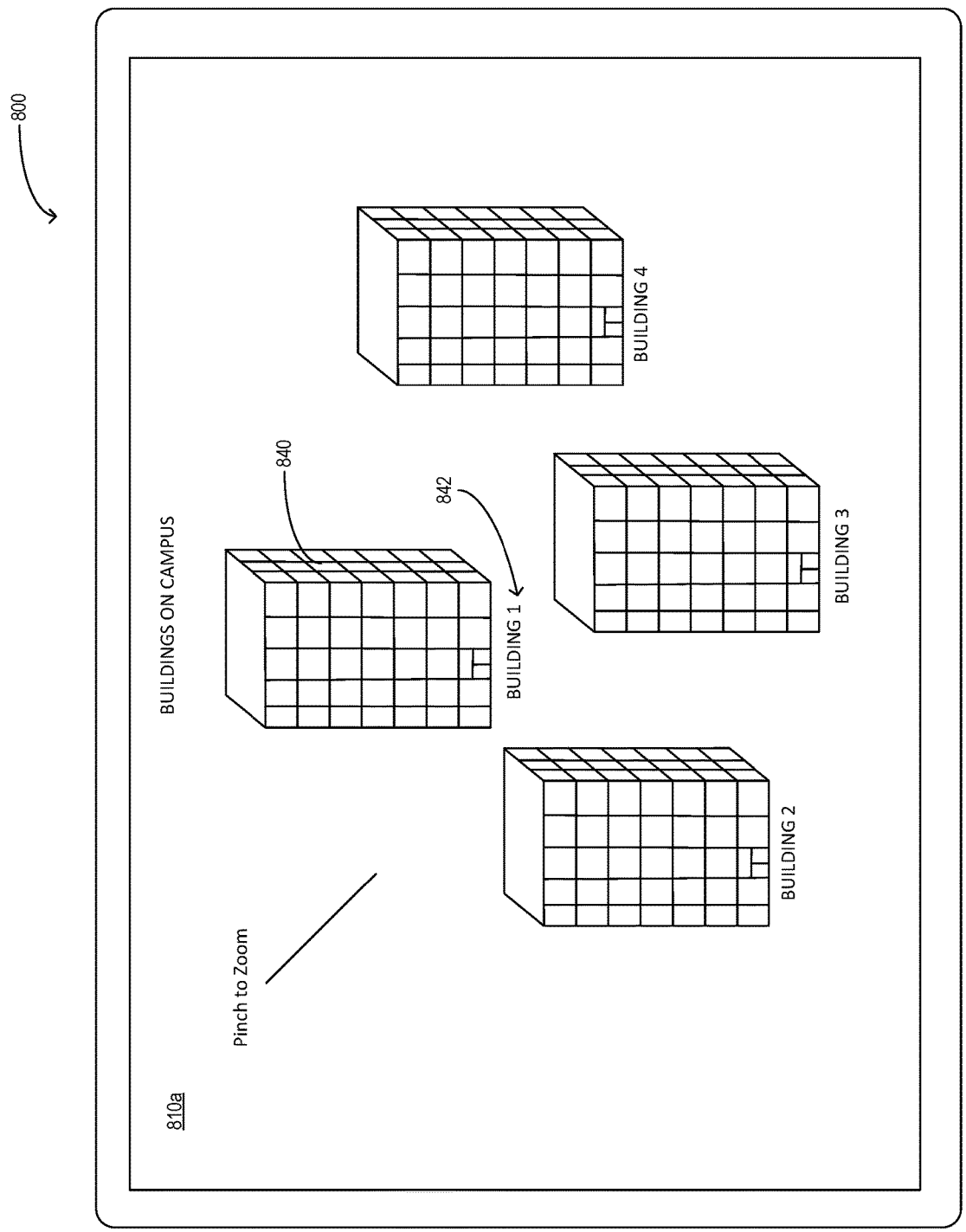
FIGS. 8A-8D depict example user interfaces for viewing and/or controlling electrical loads and/or load control devices at different levels of a load control environment.
Figure 8B:
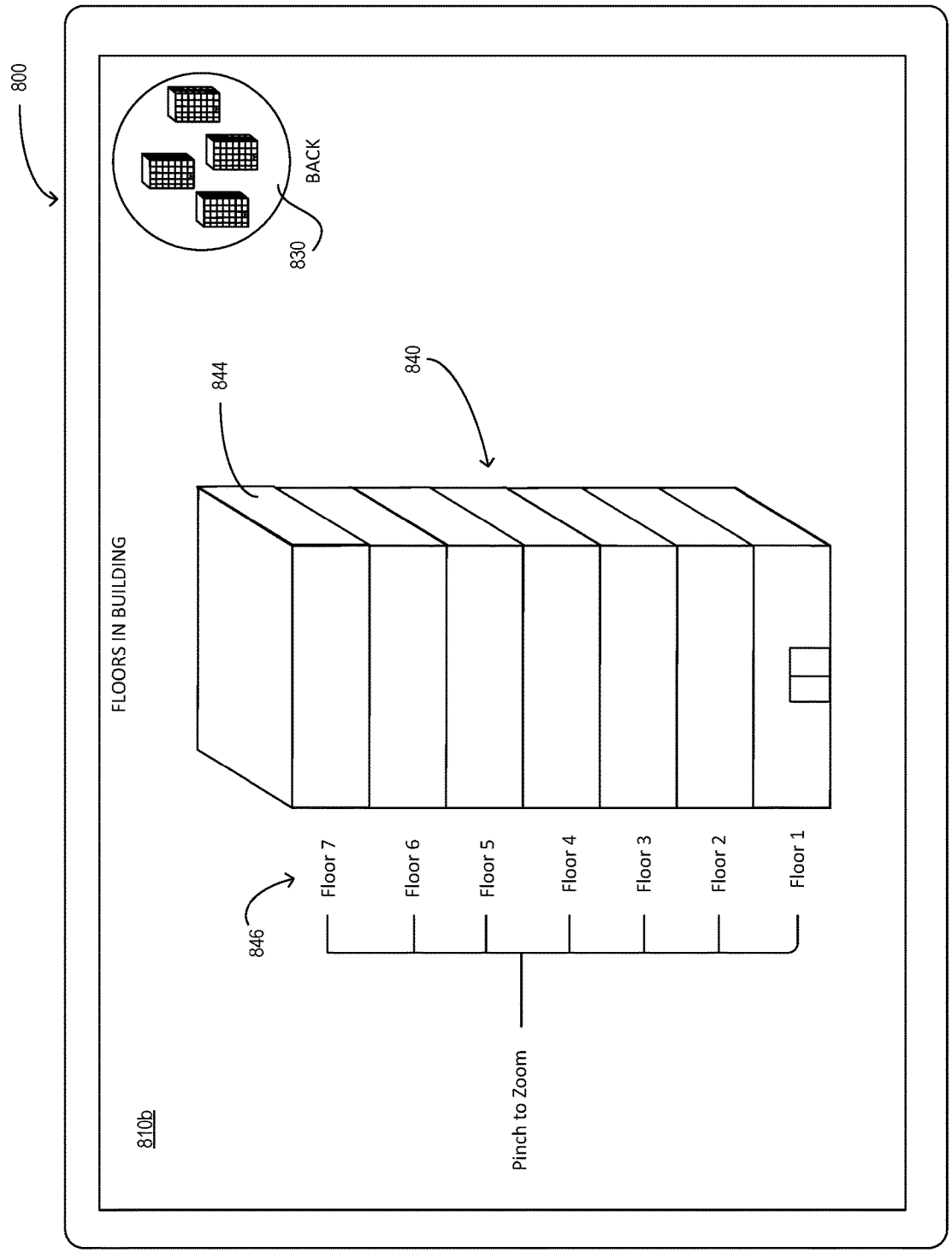

FIGS. 8A-8D depict an example graphical user interface (GUI) 800 for viewing the status of and/or controlling electrical loads, input devices, and/or load control devices at different levels of a load control environment. As shown in FIG. 8A, the GUI 800 may display one or more building icons 840 representing one or more buildings. For example, as shown in screen 810a, the GUI 800 is displaying a campus comprising four buildings that may be controlled by the same user and/or the same load control system. Each building icon 840 may have a corresponding identifier 842. The GUI 800 may be operable to allow the selection of a building. For example, a property manager or user may select a building or perform a multi-finger gesture (e.g., pinch) or other form of selection described herein to zoom into a building. Once a building is selected, the GUI 800 may switch from screen 810a in FIG. 8A to screen 810b in FIG. 8B to view a more detailed version of the load control environment in the selected building. Allowing the property manager or the user to select an area (e.g., a building, a floor, or a room) may avoid displaying unnecessary load control information in a screen. For example, as shown in FIG. 8B, one building is selected and displayed, and other buildings are not shown in the screen in FIG. 8B.

In FIG. 8B, the selected building icon 840 from screen 810a in FIG. 8A may be displayed by the GUI 800 on screen 810b. The building icon 840 may be enlarged and identify different floors 844 in the building. Each floor may have a respective floor identifier 808. Though the building icon 840 is partitioned into floors 844, the building icon 840 may be otherwise partitioned, such as by rooms, portions of rooms, portions of floors, etc.

The GUI 800 may be operable to allow for the selection of a floor 844 from the building icon 840 displayed on screen 810b to view a more detailed version of the load control environment in the selected floor or floors 844. For example, a property manager or user may select a floor 844 or perform a multi-finger gesture (e.g., pinch) to zoom into a floor of the building. Once a floor 844 is selected, the GUI 800 may switch from screen 810b in FIG. 8B to screen 810c in FIG. 8C to view a more detailed version of the load control environment in the selected floor 844. The GUI 800 may be operable to allow the user to return to a previous screen, for example, by performing a different multi-finger gesture (e.g., bringing fingers closer together on the display) or by selecting the Back button 830. Though not shown, each floor 844 of the building icon 840 may show one or more loads, load control devices, and/or input devices for being selected for control and/or status.

Figure 8C:
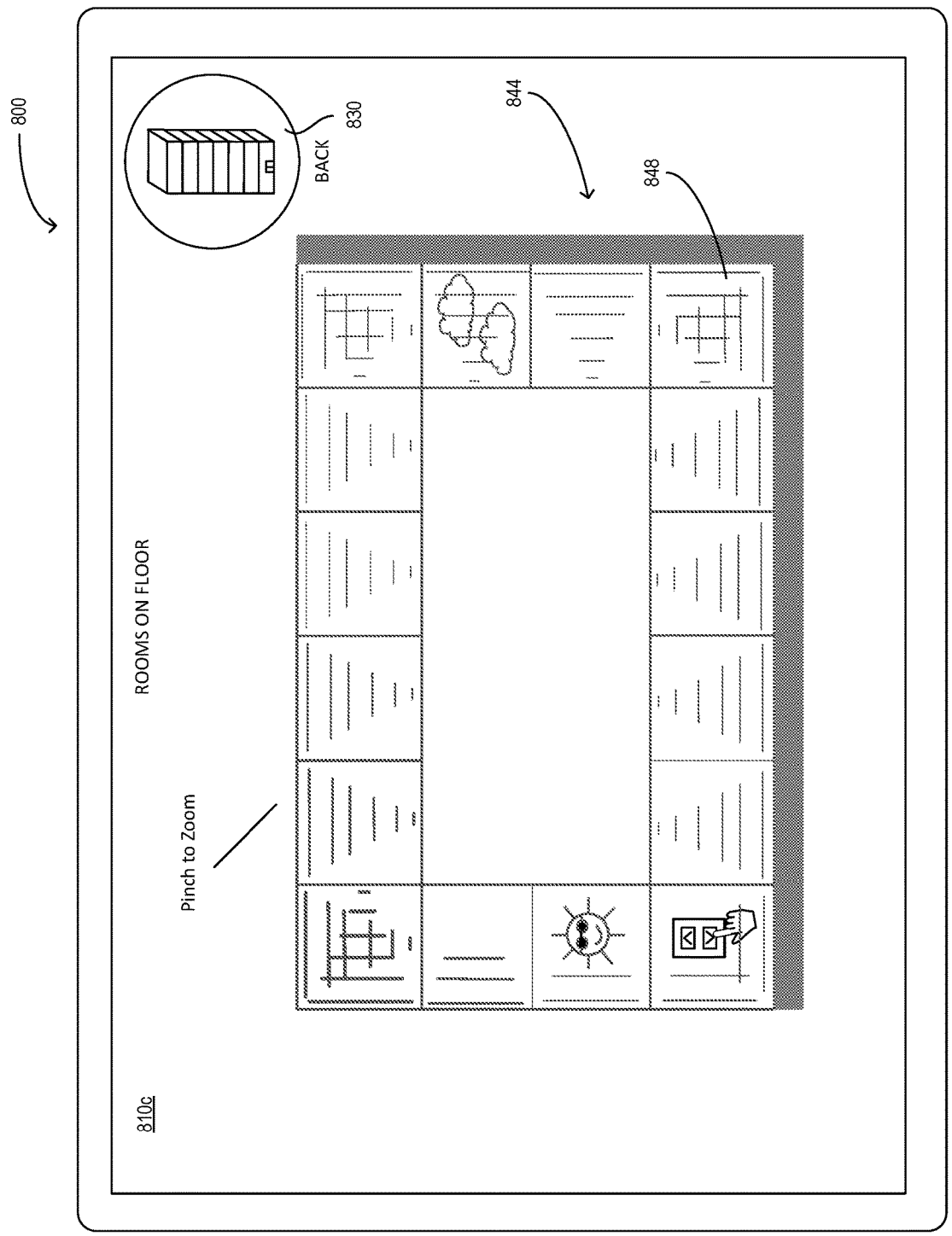

In FIG. 8C, the selected floor 844 from screen 810b in FIG. 8B may be displayed in the GUI 800 on screen 810c. The GUI 800 may be operable to allow for the selection of a room 848 from the floor 844 displayed on screen 810c to view a more detailed version of the load control environment in the selected room or rooms 848. For example, a property manager or user may select a room 848 or perform a multi-finger gesture (e.g., pinch) to zoom into a room 848 on the floor 844. Each room 848 may have a room identifier, such as office, conference room, kitchen, etc. The rooms 848 may also have a more specific identifier, such as the name of the person's office, the name of the conference room, and/or a generic differentiator for the same types of rooms. Once a room 848 is selected, the GUI 800 may switch from screen 810c in FIG. 8C to screen 810d in FIG. 8D to view a more detailed version of the load control environment in the selected room 848. The GUI 800 may be operable to allow the user to return to a previous screen, for example, by performing a different multi-finger gesture (e.g., bringing fingers closer together on the display) or by selecting the Back button 830. Though each room in FIG. 8C shows the status of the motorized window treatments and the automated window treatment control system, other load control devices and/or input devices may be selected for control and/or displaying the status.

Figure 8D:
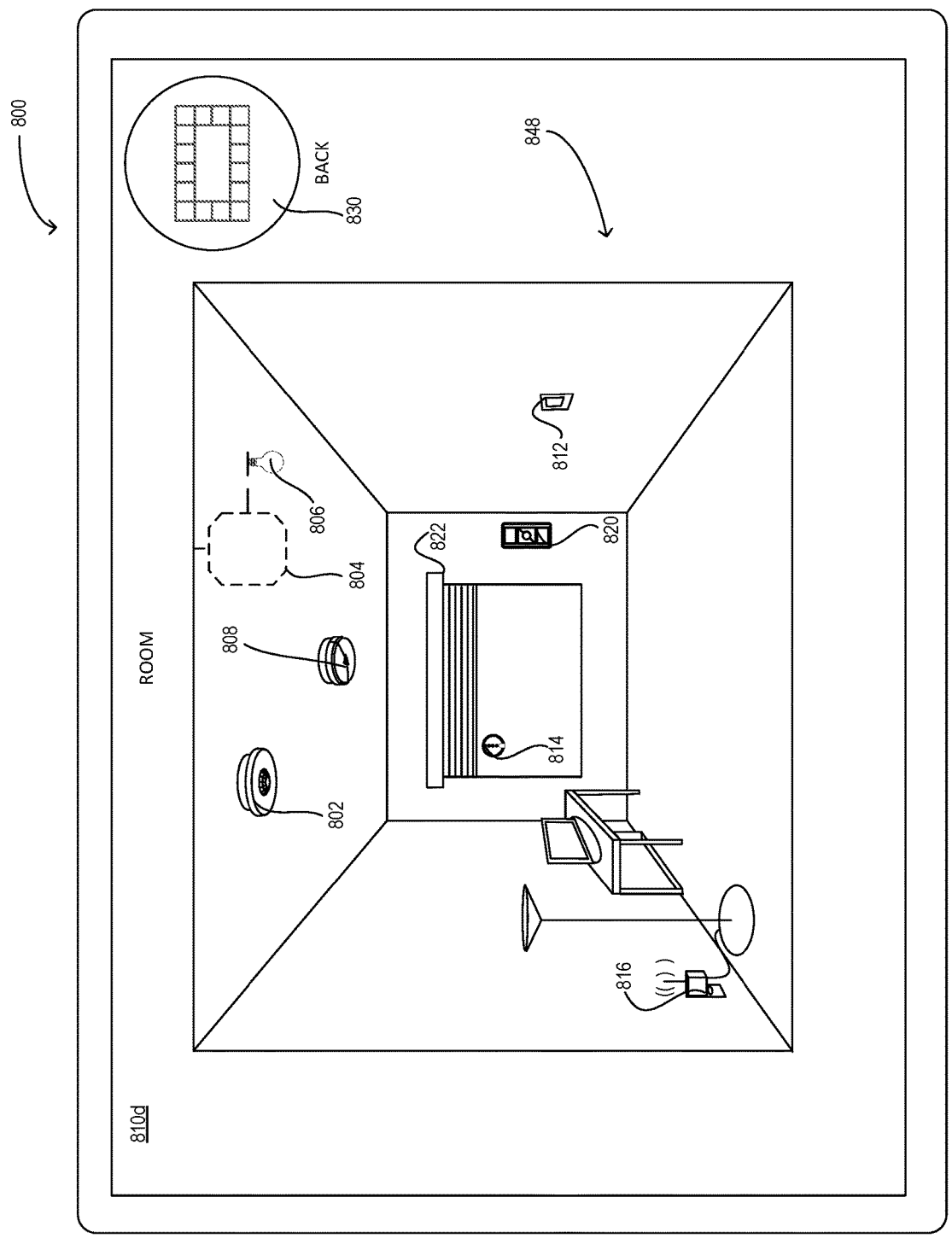

In FIG. 8D, the selected room from screen 810c in FIG. 8C may be displayed in the GUI 800 on screen 810d. The GUI 800 may be operable to allow for control and/or the display of the status of electrical loads, load control devices, and/or input devices in the room. For example, the GUI 800 may be operable to allow for the display of status information and/or control of the occupancy sensor 802, window sensor 814, daylight sensor 808, thermostat 812, lighting load 806, lighting control device 804, motorized window treatment 822, plug-in control device 816, remote control device 820, etc. in the selected room 848. In GUI 800 as depicted in FIG. 8D, the user may be able to see the location of electrical loads, load control devices, and/or input devices in the room. On the GUI 800, electrical loads, load control devices, and/or input devices in the room may be selected by clicking on the icon representing the device on the GUI 800 in the room 848. By selecting an icon on GUI 800 in FIG. 8D, the user may be able to view information related to the selected option, such as status history or current status, or control features of the selected option. The GUI 800 may be operable to allow the screen to return to a previous screen, for example, by reverse pinching or by selecting the Back button 830

The screens 810a, 810b, 810c, and 810d in the GUI 800 may be different screens or different views within the GUI 800. For example, the screens 810a, 810b, 810c, and 810d may depict different levels of detail when a user zooms in and out of a load control environment (e.g., by selection or pinching to zoom in and out). As a user zooms into an area, additional load control devices, electrical loads, and/or input devices may come into view in the GUI 800. As a user zooms out of an area, less load control devices, electrical loads, and/or input devices be within view in the GUI 800. At each level, predefined devices may be displayed to the user.

Figure 9:
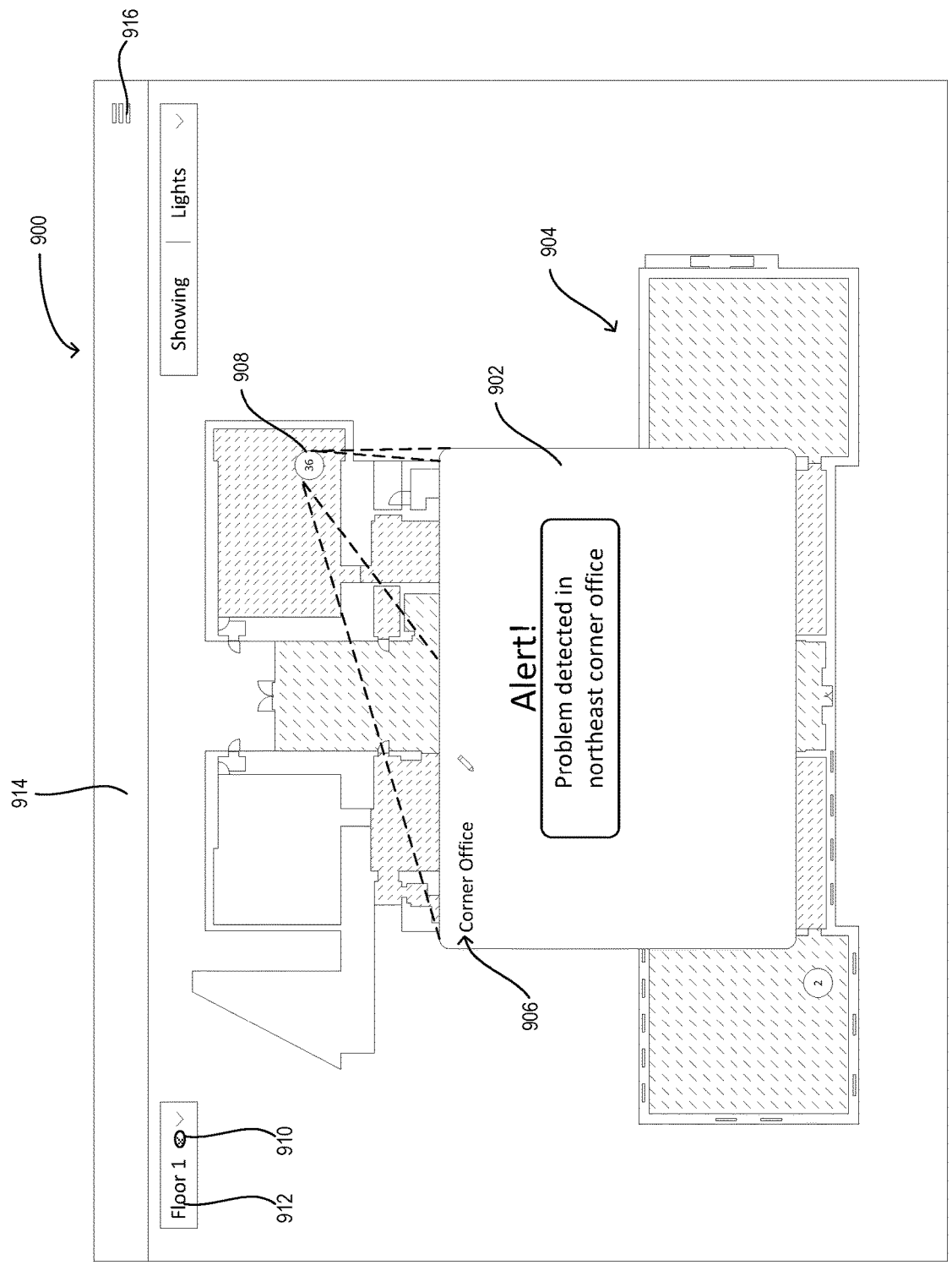
FIG. 9 depicts an example user interface for providing and/or responding to alerts in a load control environment.

FIG. 9 depicts an example GUI 900 for providing and/or responding to alerts in a load control environment. In FIG. 9, the GUI 900 may be operable to display alerts and/or information windows regarding electrical loads, load control devices, and/or input devices in a load control environment. An alert indicator 908 may be displayed in the floorplan 904 to identify the location in the floorplan 904 for the alert. An alert indicator may be displayed next to or on top of an interface selection icon 916, next to a floor icon 912, or in a marquis or window pane 914.

An alert window 902 may display the trigger for the alert, the location 906 of the trigger for the alert (e.g., the location in a floorplan 904), the cause of the alert, a proposed solution, and/or functions for configuring the devices. The alert window 902 may be automatically displayed or may be displayed upon user selection of the alert indicator 908. The computing device may intelligently analyze the reason for the alert and provide recommendations for how to remedy the cause of the alert and/or explanations for why the alert was triggered. The computing device may store automated solutions for responding to an alert. As changes to a device configuration are performed in response to an alert, the computing device may learn to propose the solution or automatically solve a similar problem in the future based on what it learned (e.g., after a predetermined number of times). An alert may be customized so that it may be displayed to allow a user to proactively remedy a potential problem. In addition, an energy usage or energy savings icon 910 may be displayed to show the energy usage and/or energy saving for a floor and/or a room (e.g., as a percentage or a total measured energy in units and/or cost).

The alert window 902 may allow the user to select a remedy for the cause of the alert and the system may apply that remedy. The alert window 902 may provide general notifications regarding the activity of the system. For example, the alert window 902 may display that an occupancy sensor is malfunctioning or low on battery, the alert window 902 may display that a heating or cooling system is triggering HVAC in a room, that a location is using more than a predefined amount of energy, etc. The information displayed in the alert window 902 may be sent electronically to a system manager, as well as being displayed in GUI 900. The alert window 902 may be utilized for security or energy savings. For example, the system may send a notification that an occupancy sensor was triggered during an hour in which a room is not normally occupied. Similarly, the system may send a notification that lights are on in an area of the building despite the area being unoccupied, and provide the option to turn the lights off when prompted with the notification.

Figure 10:
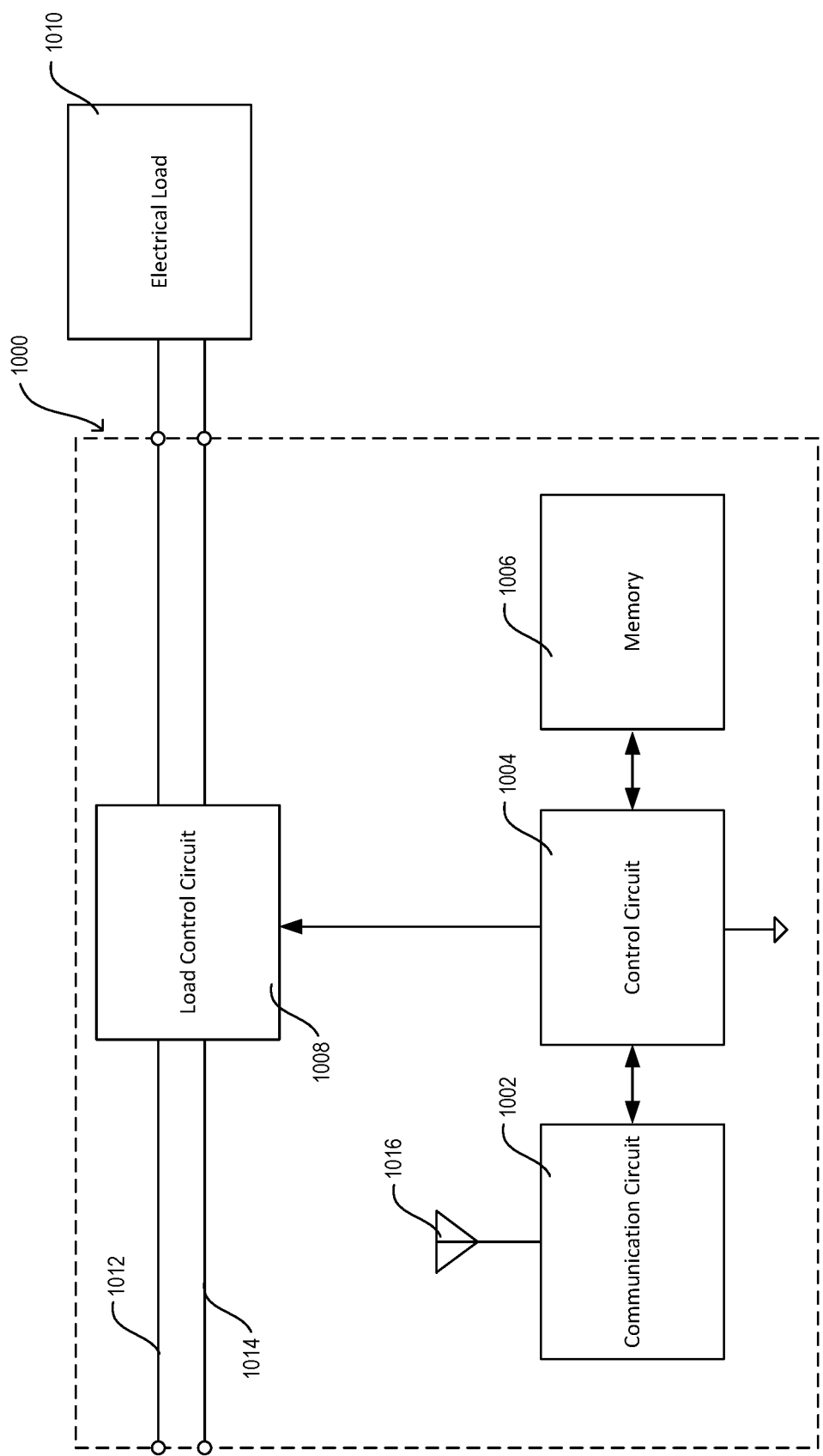
FIG. 10 is a block diagram depicting an example load control device.

FIG. 10 is a block diagram depicting an example load control device 1000. The load control device 1000 may include a dimmer switch, an electronic switch, an electronic ballast for controlling fluorescent lamps, a light-emitting diode (LED) driver for controlling LED light sources, a plug-in control device (e.g., a switching device), a thermostat, a motorized window treatment, or other control-target device for controlling an electrical load 1010. The load control device 1000 may include a control circuit 1004 for controlling the functionality of the load control device 1000. The control circuit 1004 may include one or more general purpose processors, special purpose processors, conventional processors, digital signal processors (DSPs), microprocessors, integrated circuits, a programmable logic device (PLD), application specific integrated circuits (ASICs), or the like. The control circuit 1004 may perform signal coding, data processing, image processing, power control, input/output processing, or any other functionality that enables the load control device 1000 to perform as described herein.

The load control device 1000 may communicate with other devices (e.g., input devices) via the communication circuit 1002. The communication circuit 1002 may be in communication with controller 1004. The communication circuit 1002 maybe capable of performing wired and/or wireless communications. The communication circuit 1002 may include an RF transceiver for transmitting and receiving RF signals via an antenna, or other communications module capable of performing wired and/or wireless communications. For example, the communication circuit 1002 may be capable of communicating via WI-FI®, WIMAX®, BLUETOOTH®, near field communication (NFC), a proprietary communication protocol, such as CLEAR CONNECT™, ZIGBEE®, Z-WAVE, or the like.

The control circuit 1004 may store information in and/or retrieve information from the memory 1006. The memory 1006 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory card, or any other type of removable memory. The control circuit 1004 may access control instructions in the memory 1006 for controlling the electrical load 1010 and performing other functions.

The load control circuit 1008 may receive instructions from the control circuit 1004 and may control the electrical load 1010 (e.g., by controlling the amount of power provided to the load) based on the received instructions. The load control circuit 1008 may receive power via a hot connection 1012 and a neutral connection 1014. While the load control device 1000 includes four terminals as shown in FIG. 10, the load control device 1000 may include one load terminal connected to the electrical load 1010, which may be connected in series between the load control device 1000 and a neutral of the AC power source supplying power to the hot connection 1012 and the neutral connection 1014. In other words, the load control device 1000 may be a "three-wire" device. The load control device 1000 may have one connection to the AC power source (e.g., hot connection 1012) and may not comprise a connection to the neutral of the AC power source (e.g., may not comprise neutral connection 1014). In other words, the load control device 1000 may be a "two-wire" device. The electrical load 1010 may include any type of electrical load.

Figure 11:
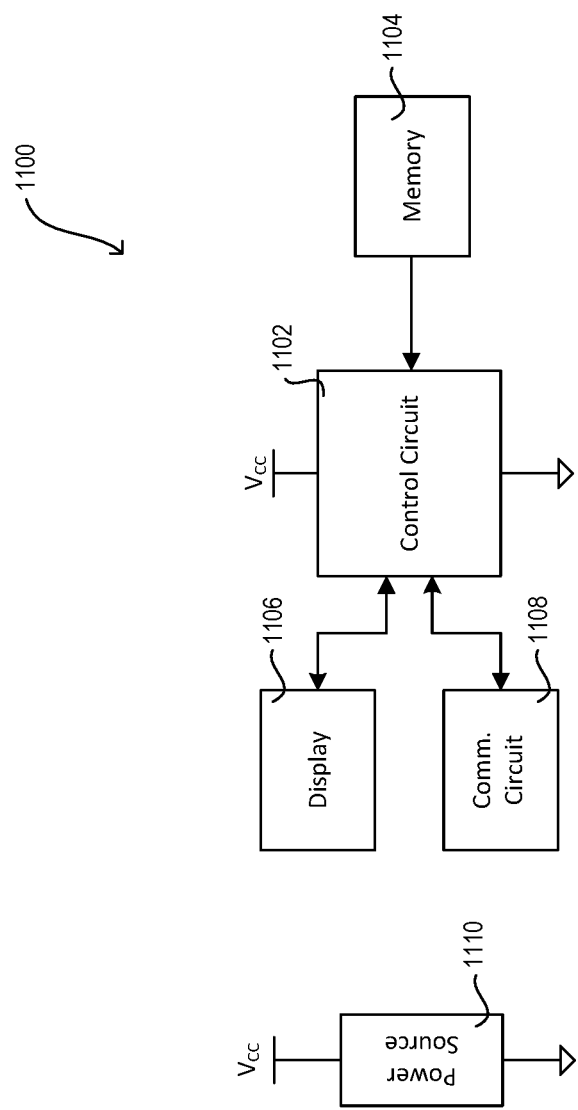
FIG. 11 is a block diagram depicting an example computing device.

FIG. 11 is a block diagram illustrating an example computing device 1100 as described herein. The computing device 1100 may include a user device or a system controller, for example. The computing device 1100 may include a control circuit 1102 for controlling the functionality of the computing device 1100. The control circuit 1102 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 1102 may perform signal coding, data processing, power control, image processing, input/output processing, and/or any other functionality that enables the computing device 1100 to perform as described herein.

The control circuit 1102 may store information in and/or retrieve information from the memory 1104. The memory 1104 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 1102 may access executable instructions in the memory 1104 for performing as described herein.

The computing device 1100 may include a communication circuit 1108 for transmitting and/or receiving information via wired and/or wireless signals. For example, the communications circuit 1108 may include an RF transceiver for transmitting and receiving RF signals via an antenna, or other communications module capable of performing wired and/or wireless communications. Communications circuit 1108 may be in communication with the control circuit 1102. The control circuit 1102 may also be in communication with a display 1106 for providing information to a user. The communication between the display 1106 and the control circuit 1102 may be a two way communication, as the display 1106 may include a touch screen module capable of receiving indications from a user and providing such indications to the control circuit 1102. Each of the modules within the computing device 1100 may be powered by a power source 1110. The power source 1110 may include an AC power supply or DC power supply, for example. The power source 1110 may generate a DC supply voltage $V_{CC}$ for powering the modules within the computing device 1100.

Figure 12:
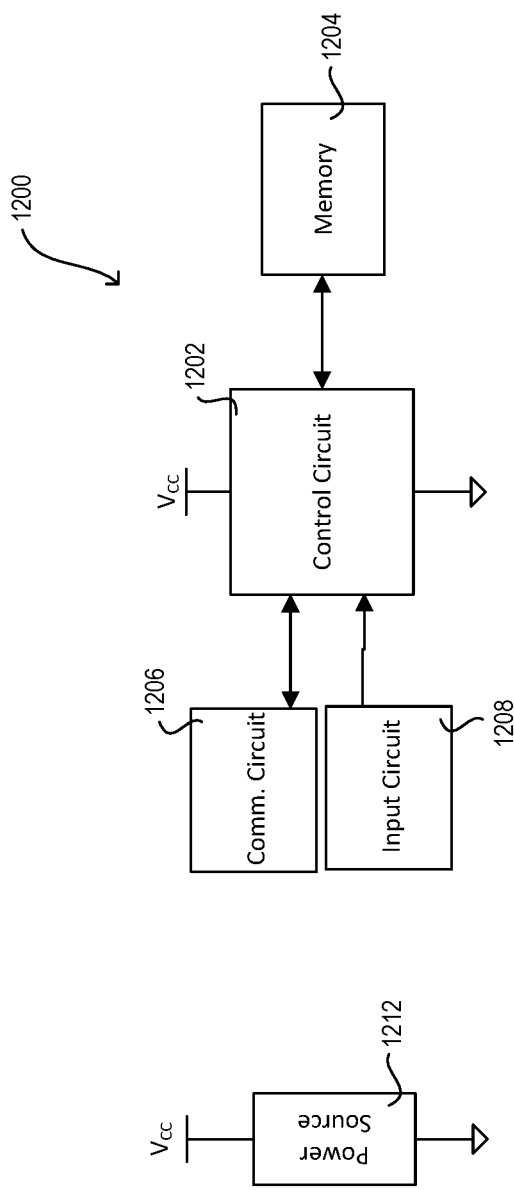
FIG. 12 is a block diagram illustrating an example input device.

FIG. 12 is a block diagram illustrating an example input device 1200. The input device 1200 may include a control circuit 1202 for controlling the functionality of the input device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), or the like. The control circuit 1202 may perform signal coding, data processing, power control, input/output processing, or any other functionality that enables the input device 1200 to perform as described herein.

The control circuit 1202 may store information in and/or retrieve information from a memory 1204. The memory 1204 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory card, or any other type of removable memory.

The input device 1200 may include a communication circuit 1206 for transmitting and/or receiving information from other devices. The communication circuit 1206 may perform wireless or wired communications. Communication circuit 1206 may be in communication with control circuit 1202 for transmitting and/or receiving information. The communication circuit 1206 may include an RF transceiver for transmitting and receiving RF signals via an antenna, or other communications module capable of performing wired and/or wireless communications. For example, the communication circuit 1206 may be capable of communicating via WI-FI®, WIMAX®, BLUETOOTH®, near field communication (NFC), a proprietary communication protocol, such as CLEAR CONNECT™, ZIGBEE®, Z-WAVE, or the like.

The control circuit 1202 may be in communication with an input circuit 1208. The input circuit may include a display (e.g., a visual display, such as an LED display) or another input device (e.g., keyboard or one or more other buttons) for providing information to the control circuit 1202. Each of the modules of the input device 1200 may be powered by a power source 1212. The power source 1212 may include an AC power supply or DC power supply, for example. The power source 1212 may generate a supply voltage VCC for powering the modules within the wireless communication device 1200.

Although features and elements have been described in relation to particular embodiments, many other variations, modifications, and other uses are apparent from the description provided herein. For example, while various types of hardware and/or software may be described for performing various features, other hardware and/or software modules may be implemented. The disclosure herein may not be limited by the examples provided. The functionality of the computing devices herein may be included in a single computing device or distributed across multiple computing devices, such as a server or a system controller and another computing device. The server or system controller may display the user interface on the other computing device via a web browser or other application.

What is claimed is:

1. A computing device comprising:
a communication circuit configured to communicate with a user device; and
a processor configured to:
receive occupancy information of a room from an occupancy sensor in the room and a time of day corresponding to the occupancy information, wherein the room is located on a floor of a building;
store the occupancy information and the corresponding time of day in a record of a memory;
receive an indication that an occupancy option has been selected via a graphical user interface (GUI) displayed on the user device;
receive an indication that the time of day has been selected via the GUI displayed on the user device;
retrieve, from the record of the memory, the occupancy information of the room based on the selected time of day;
send a message, based on the occupancy information retrieved from the record of the memory, to control the user device to display a floorplan that indicates at least an occupancy status of the room at the selected time of day;
receive an indication that a time period has been selected via the GUI displayed on the user device, the time period comprising the time of day;
retrieve occupancy information of the room corresponding to the time period from the record of the memory;
receive an indication that a playback has been selected via the GUI displayed on the user device; and
send a message to control the user device to play back the occupancy status of the room in the floorplan over the time period based on the retrieved occupancy information of the room corresponding to the time period,
wherein the occupancy status of the room in the floorplan switches between an occupied status and a vacant status over at least a part of the time period.

2. The computing device of claim 1, wherein the processor is further configured to:
receive an indication that one of rewind, fast-forward, skip forward, or skip back has been selected via the GUI displayed on the user device; and
send a message to control the user device to display the occupancy status of the room in the floorplan over the time period based on the indication of one of the selected rewind, fast-forward, skip forward, or skip back.

3. The computing device of claim 1, wherein a plurality of rooms are located on the floor of the building, the room is one of the plurality of rooms on the floor, and the processor is further configured to:
receive respective occupancy information of the plurality of rooms from respective occupancy sensors in the plurality of rooms on the floor, and a time of day corresponding to the respective occupancy information of the plurality of rooms on the floor;
store the respective occupancy information of the plurality of rooms in the record of the memory;
retrieve, from the record of the memory, the respective occupancy information of the plurality of rooms based on the selected time of day; and
send a message to control the user device to display the floorplan comprising the plurality of rooms to indicate respective occupancy statuses of the plurality of rooms at the selected time of day based on the respective occupancy information of the plurality of rooms retrieved from the record of the memory.

4. The computing device of claim 3, wherein the room of the plurality of rooms is occupied at the selected time of day, and another room of the plurality of rooms is vacant at the selected time of day, wherein the floorplan comprises a first graphical representation of the occupied room and a second graphical representation of the vacant room, the first graphical representation being different from the second graphical representation.

5. The computing device of claim 4, wherein the processor is further configured to:
retrieve respective occupancy information of the plurality of rooms corresponding to the time period from the record of the memory; and
send a message to control the user device to play back the respective occupancy statuses of the plurality of rooms in the floorplan over the time period based on the retrieved respective occupancy information of the plurality of rooms corresponding to the time period,
wherein one or more of the respective occupancy statuses of the plurality of rooms in the floorplan switch between an occupied status and a vacant status over at least a part of the time period.

6. The computing device of claim 3, wherein the processor is further configured to:
retrieve respective occupancy information of the plurality of rooms corresponding to the time period from the record of the memory;
receive an indication that one of rewind, fast-forward, skip forward, or skip back has been selected via the GUI displayed on the user device; and send a message to control the user device to display the respective occupancy statuses of the plurality of rooms in the floorplan over the time period based on the indication of one of the selected rewind, fast-forward, skip forward, or skip back.

7. The computing device of claim 1, wherein the processor is further configured to send a message to control the user device to display a zoomed-in or zoomed-out view of the building based on an indication to transition between a plurality of load control levels, wherein a respective load control level of the plurality of load control levels corresponds to a plurality of floors of the building, a plurality of rooms on the floor, the room on the floor, or a portion of the room on the floor.

8. The computing device of claim 7, wherein the zoomed-in view of the building comprises a view of the plurality of floors of the building, the plurality of rooms on the floor, the room on the floor, or the portion of the room on the floor, and the processor is further configured to receive the indication to transition between the plurality of load control levels via the GUI displayed on the user device.

9. The computing device of claim 1, wherein the computing device is in a server that is separate from the user device.

10. A method comprising:
receiving occupancy information of a room from an occupancy sensor in the room and a time of day corresponding to the occupancy information, wherein the room is located on a floor of a building;
storing the occupancy information of the room and the corresponding time of day in a record of a memory;
receiving an indication that an occupancy option has been selected via a graphical user interface (GUI) displayed on a user device;
receiving an indication that the time of day has been selected via the GUI displayed on the user device;
retrieving, from the record of the memory, the occupancy information of the room based on the selected time of day;
sending a message, based on the occupancy information retrieved from the record of the memory, to control the user device to display a floorplan that indicates at least an occupancy status of the room at the selected time of day;
receiving an indication that a time period has been selected via the GUI displayed on the user device, the time period comprising the time of day;
retrieving occupancy information of the room corresponding to the time period from the record of the memory;
receiving an indication that a playback has been selected via the GUI displayed on the user device; and
sending a message to control the user device to play back the occupancy status of the room in the floorplan over the time period based on the retrieved occupancy information of the room corresponding to the time period, wherein the occupancy status of the room in the floorplan switches between an occupied status and a vacant status over at least a part of the time period.

11. The method of claim 10, further comprising:
receiving an indication that one of rewind, fast-forward, skip forward, or skip back has been selected via the GUI displayed on the user device; and
sending a message to control the user device to display the occupancy status of the room in the floorplan over the time period based on the indication of one of the selected rewind, fast-forward, skip forward, or skip back.

12. The method of claim 10, wherein a plurality of rooms is located on the floor of the building, and the room is one of the plurality of rooms on the floor, the method further comprising:
receiving respective occupancy information of the plurality of rooms from respective occupancy sensors in the plurality of rooms on the floor, and the time of day corresponding to the respective occupancy information of the plurality of rooms on the floor;
storing the respective occupancy information of the plurality of rooms in the record of the memory;
retrieving, from the record of the memory, the respective occupancy information of the plurality of rooms based on the selected time of day; and
sending a message to control the user device to display the floorplan comprising the plurality of rooms to indicate respective occupancy statuses of the plurality of rooms at the selected time of day based on the respective occupancy information of the plurality of rooms retrieved from the record of the memory.

13. The method of claim 12, wherein the room of the plurality of rooms is occupied at the selected time of day, and another room of the plurality of rooms is vacant at the selected time of day, wherein the floorplan comprises a first graphical representation of the occupied room and a second graphical representation of the vacant room, the first graphical representation being different from the second graphical representation.

14. The method of claim 12, further comprising:
retrieving respective occupancy information of the plurality of rooms corresponding to the time period from the record of the memory; and
sending a message to control the user device to play back the respective occupancy statuses of the plurality of rooms in the floorplan over the time period based on the retrieved respective occupancy information of the plurality of rooms corresponding to the time period, wherein one or more of the respective occupancy statuses of the plurality of rooms in the floorplan switch between an occupied status and a vacant status over at least a part of the time period.

15. The method of claim 12, further comprising:
retrieving respective occupancy information of the plurality of rooms corresponding to the time period from the record of the memory;
receiving an indication that one of rewind, fast-forward, skip forward, or skip back has been selected via the GUI displayed on the user device; and
sending a message to control the user device to display the respective occupancy statuses of the plurality of rooms in the floorplan over the time period based on the indication of one of the selected rewind, fast-forward, skip forward, or skip back.

16. The method of claim 10, further comprising sending a message to control the user device to display a zoomed-in or zoomed-out view of the building based on an indication to transition between a plurality of load control levels, wherein a respective load control level of the plurality of load control levels corresponds to a plurality of floors of the building, a plurality of rooms on the floor, the room on the floor, or a portion of the room on the floor.

17. The method of claim 16, wherein the zoomed-in view of the building comprises a view of the plurality of floors of the building, the plurality of rooms on the floor, the room on the floor, or the portion of the room on the floor, the method further comprising receiving the indication to transition between the plurality of load control levels via the GUI displayed on the user device.

18. A system controller comprising:
a display comprising a graphic user interface (GUI); and
a control circuit configured to:
  receive occupancy information of a room from an occupancy sensor in the room and a time of day corresponding to the occupancy information, wherein the room is located on a floor of a building,
  store the occupancy information of the room and the corresponding time of day in a record of a memory;
  receive an indication that an occupancy option has been selected via the GUI on the display;
  receive an indication that the time of day has been selected via the GUI on the display;
  retrieve, from the record of the memory, the occupancy information of the room based on the selected time of day; and
  control the GUI on the display, based on the occupancy information retrieved from the record of the memory, to display a floorplan that indicates at least an occupancy status of the room at the selected time of day,
wherein the control circuit is further configured to:
  receive an indication that a time period has been selected via the GUI displayed on the user device, the time period comprising the time of day;
  retrieve occupancy information of the room corresponding to the time period from the record of the memory;
  receive an indication that a playback has been selected via the GUI displayed on the user device; and
  control the GUI on the display to play back the occupancy status of the room in the floorplan over the time period based on the retrieved occupancy information of the room corresponding to the time period,
wherein the occupancy status of the room in the floorplan switches between an occupied status and a vacant status over at least a part of the time period.

* * * * *